US009061909B2

(12) United States Patent
Noda et al.

(10) Patent No.: US 9,061,909 B2
(45) Date of Patent: Jun. 23, 2015

(54) METHOD FOR SIMULTANEOUSLY PRODUCING CARBON NANOTUBES AND HYDROGEN, AND DEVICE FOR SIMULTANEOUSLY PRODUCING CARBON NANOTUBES AND HYDROGEN

(75) Inventors: Suguru Noda, Tokyo (JP); Dong Young Kim, Tokyo (JP); Toshio Osawa, Tokyo (JP); Hisashi Sugime, Tokyo (JP); Kei Hasegawa, Tokyo (JP); Eisuke Haba, Tsukuba (JP)

(73) Assignees: The University of Tokyo, Tokyo (JP); Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 13/394,947
(22) PCT Filed: Sep. 9, 2010
(86) PCT No.: PCT/JP2010/065514
§ 371 (c)(1), (2), (4) Date: May 4, 2012
(87) PCT Pub. No.: WO2011/030821
PCT Pub. Date: Mar. 17, 2011

(65) Prior Publication Data
US 2012/0219490 A1 Aug. 30, 2012

(30) Foreign Application Priority Data
Sep. 10, 2009 (JP) .............................. P2009-209844

(51) Int. Cl.
*C01B 31/02* (2006.01)
*C01B 3/26* (2006.01)
(Continued)

(52) U.S. Cl.
CPC . *C01B 3/26* (2013.01); *B01J 21/04* (2013.01); *B01J 23/745* (2013.01);
(Continued)

(58) Field of Classification Search
CPC ...... B01J 21/04; B01J 23/745; B01J 37/0201; B01J 37/086; B01J 37/347; B82Y 30/00; B82Y 40/00; C01B 3/02; C01B 31/0206; C01B 31/024; C01B 2203/0277; C01B 2203/04; C01B 2203/085; H01G 11/36; H01M 4/587; Y02E 60/13
USPC ............. 423/447.1, 447.3; 977/742, 842, 843
See application file for complete search history.

(56) References Cited

U.S. PATENT DOCUMENTS 4,098,847 A * 7/1978 Stevenson et al. ............ 525/243
6,333,016 B1 12/2001 Resasco et al.
(Continued)

FOREIGN PATENT DOCUMENTS

CN 1315291 10/2001
CN 1724343 1/2006
(Continued)

OTHER PUBLICATIONS

Catalytic Nonoxidative Dehydrogenation of Ethane over Fe—Ni and Ni Catalysts Supported on Mg(Al)O to Produce Hydrogen and Easily Purified Carbon Nanotubes Wenqin Shen, Yuguo Wang, Xuebei Shi, Naresh Shah, Frank Huggins, Shilpa Bollineni, Mohindar Seehra, and Gerald Huffman Energy & Fuels 2007 21 (6), 3520-3529.*
(Continued)

*Primary Examiner* — Richard M Rump
(74) *Attorney, Agent, or Firm* — Fitch, Even, Tabin & Flannery LLP

(57) ABSTRACT

A method for simultaneously producing carbon nanotubes and hydrogen according to the present invention is a method for simultaneously producing carbon nanotubes and hydrogen, in which using a carbon source containing carbon atoms and hydrogen atoms and being decomposed in a heated state, and a catalyst for producing carbon nanotubes and $H_2$ from the carbon source, the above carbon nanotubes are synthesized on a support in a heated state, placed in a reactor, and simultaneously, the above $H_2$ is synthesized from the above carbon source, the method comprising a synthesis step of flowing a source gas comprising the above carbon source over the above support, on which the above catalyst is supported, to synthesize the above carbon nanotubes on the above support and simultaneously synthesize the above $H_2$ in a gas flow.

32 Claims, 15 Drawing Sheets

(51) Int. Cl.
*B01J 21/04* (2006.01)
*B01J 23/745* (2006.01)
*B01J 37/02* (2006.01)
*B01J 37/08* (2006.01)
*B01J 37/34* (2006.01)
*B82Y 30/00* (2011.01)
*B82Y 40/00* (2011.01)
*H01G 11/36* (2013.01)
*H01M 4/587* (2010.01)

(52) U.S. Cl.
CPC ............ *B01J 37/0201* (2013.01); *B01J 37/086* (2013.01); *B01J 37/347* (2013.01); *B82Y 30/00* (2013.01); *B82Y 40/00* (2013.01); *C01B 31/0206* (2013.01); *C01B 2203/0277* (2013.01); *C01B 2203/04* (2013.01); *C01B 2203/085* (2013.01); *H01G 11/36* (2013.01); *H01M 4/587* (2013.01); *Y02E 60/13* (2013.01); *C01B 31/024* (2013.01)

(56) References Cited

U.S. PATENT DOCUMENTS

| | | | |
|---|---|---|---|
| 6,413,487 | B1 | 7/2002 | Resasco et al. |
| 6,919,064 | B2 * | 7/2005 | Resasco et al. ............ 423/447.3 |
| 6,955,800 | B2 | 10/2005 | Resasco et al. |
| 6,962,892 | B2 | 11/2005 | Resasco et al. |
| 6,994,907 | B2 | 2/2006 | Resasco et al. |
| 7,094,386 | B2 | 8/2006 | Resasco et al. |
| 7,153,903 | B1 | 12/2006 | Barraza et al. |
| 7,279,247 | B2 | 10/2007 | Matarredona et al. |
| 2006/0104887 | A1 * | 5/2006 | Fujioka et al. ............. 423/447.3 |
| 2009/0099016 | A1 | 4/2009 | Carruthers et al. |
| 2010/0247421 | A1 * | 9/2010 | Noda et al. ................. 423/447.3 |

FOREIGN PATENT DOCUMENTS

| | | |
|---|---|---|
| CN | 101049927 | 10/2007 |
| EP | 1 391 425 | 2/2004 |
| FR | 2 826 596 | 1/2003 |
| JP | 08-225302 | 9/1996 |
| JP | 3035038 | 2/2000 |
| JP | 2003-286015 | 10/2003 |
| JP | 2006027948 | 2/2006 |
| WO | WO 2008/029927 | 3/2008 |
| WO | WO 2009/110591 | 9/2009 |

OTHER PUBLICATIONS

Weilong Li, Hui Wang, Zhaoyu Ren, Gang Wang, Jinbo Bai, Co-production of hydrogen and multi-wall carbon nanotubes from ethanol decomposition over Fe/Al2O3 catalysts, Applied Catalysis B: Environmental, vol. 84, Issues 3-4, Dec. 1, 2008, pp. 433-439, ISSN 0926-3373, 10.1016/j.apcatb.2008.04.026.*
Qian Weizhong, Liu Tang, Wang Zhanwen, Wei Fei, Li Zhifei, Luo Guohua, Li Yongdan, Production of hydrogen and carbon nanotubes from methane decomposition in a two-stage fluidized bed reactor, Applied Catalysis A: General, vol. 260, Issue 2, Apr. 8, 2004, pp. 223-228, ISSN 0926-860X, 10.1016/j.apcata.2003.10.018.*
Weizhong, Qian, et al. "Production of carbon nanotubes in a packed bed and a fluidized bed." AIChE journal 49.3 (2003): 619-625.*
Zein, Sharif Hussein Sharif, and Abdul Rahman Mohamed. "Mn/Ni/TiO2 catalyst for the production of hydrogen and carbon nanotubes from methane decomposition." Energy & fuels 18.5 (2004): 1336-1345.*
Translation of the International Preliminary Report on Patentability dated Apr. 19, 2012, for International (PCT) Application No. PCT/JP2010/065514.
International Search Report dated Sep. 24, 2010, for International (PCT) Application No. PCT/JP2010/065514.

R. Saito, et al., "Synthesis method of nanotubes", *Introduction and Application of Carbon Nanotubes*, Baifukan Co., Ltd., Mar. 31, 2004.
S. Iijima, "Helical microtubules of graphitic carbon", *Nature*, vol. 354, Nov. 7, 1991, pp. 56-58.
H. Dai, et al., "Single-wall nanotubes produced by metal-catalyzed disproportionation of carbon monoxide", *Chemical Physics Letters*, vol. 260, Sep. 27, 1996, pp. 471-475.
M. J. Bronikowski, et al., "Gas-phase production of carbon single-walled nanotubes from carbon monoxide via the HiPco process: A parametric study", *J. Vac. Sci. Technol. A*, vol. 19, No. 4, Jul./Aug. 2001, pp. 1800-1805.
K. Hata, et al., "Water-Assisted Highly Efficient Synthesis of Impurity-Free Single-Walled Carbon Nanotubes", *Science*, vol. 306, Nov. 19, 2004, pp. 1362-1364.
E. Yagasaki, "Methane Bunkai ni yoru Suiso to Carbon Nanotube no Heisan", *R&D News Kansai*, No. 423, Nov. 30, 2004, pp. 20 and 21.
W. Shen, et al., "Catalytic Nonoxidative dehydrogenation of Ethane over Fe—Ni- and Ni Catalysts Supported on Mg(Al)O to Produce Hydrogen and Easily Purified Carbon Nanotubes", *Energy & Fuels*, vol. 21, No. 6, 2007, pp. 3520-3529.
G. Wang, et al., "Simultaneous production of hydrogen and multi-walled carbon nanotubes by ethanol decomposition over Ni/Al$_2$O$_3$ catalysts", *Applied Catalysis B: Environmental*, vol. 88, 2009, pp. 142-151.
D. Y. Kim, et al., "Fluidized Bed Synthesis of Sub-Millimeter-Long Single-Walled Carbon Nanotubes", Department of Chemical System Engineering, School of Engineering, The University of Tokyo, Mar. 2, 2009, p. 47.
D. Y. Kim, et al., "Ryudonsoni yoru Tanso Carbon Nanotube no Gousei", The 74th Annual Meeting of the Society of Chemical Engineers, Yokohama National University, 2009.
"Tanso CNT Ryosan Tei-Cost-ka e Kaihatsu Kisou", Nikkan Kogyo Shinbun, Jul. 23, 20009, p. 25.
S. Noda, et al., "Combinatorial method to prepare metal nanoparticles that catalyze the growth of single-walled carbon nanotubes", *Applied Physics Letters*, vol. 86, No. 173106-1, 2005, 4 pages.
S. Noda, et al., "A simple combinatorial method to discover Co-Mo binary catalysts that grow vertically aligned single-walled carbon nanotubes", *Carbon*, vol. 44, 2006, pp. 1414-1419.
K. Kakehi, et al., "Supported Ni catal7ysts from nominal monolayer grow single-walled carbon nanotubes", *Chemical Physics Letters*, vol. 428, 2006, pp. 381-385.
S. Noda, et al., "Millimeter-Thick Single-Walled Carbon Nanotube Forests: Hidden Role of Catalyst Support", *The Japan Society of Applied Physics*, vol. 46, No. 17, 2007, pp. L399-L401.
K. Kakehi, et al., "Growth Valley Dividing Single- and Multi-Walled Carbon Nanotubes: Combinatorial Study of Nominal Thickness of Co Catalyst" *The Japan Society of Applied Physics*, vol. 47, No. 4, 2008, pp. 1961-1965.
Y. Shiratori, et al., "Field Emission Properties of Single-Walled Carbon Nanotubes with a Variety of Emitter Morphologies", *Japanese Journal of Applied Physics*, vol. 47, No. 6, 2008, pp. 4780-4787.
K. Kakehi, et al., "Individuals, grasses, and forests of single- and multi-walled carbon nanotubes grown by supported Co catalysts of different nominal thicknesses", *Applied Surface Science*, vol. 254, 2008, pp. 6710-6714.
K. Hasegawa, et al., "Growth Window and Possible Mechanism of Millimeter-Thick Single-Walled Carbon Nanotube Forests", *Journal of Nanoscience and Nanotechnology*, vol. 8, 2008, pp. 1-6.
Y. Shiratori, et al., "Combinatorial Evaluation for Field Emission Properties of Carbon Nanotubes", *J. Phys. Chem. C*, vol. 112, 2008, pp. 17974-17982.
Y. Yamauchi, et al., "Chemical Engineering for Technology Innovation", *Chemical Engineering Communications*, 196:1-2, 20008, pp. 267-276.
H. Sugime, et al., "Multiple "optimum" conditions for Co-Mo catalyzed growth of vertically aligned single-walled carbon nanotube forests", *Carbon*, 47, 2009, pp. 234-241.
Y. Shiratori, et al., "Efficient field emission from triode-type 1D arrays of carbon nanotubes", *Nanotechnology*, 20, 2009, pp. 1-7.

(56) References Cited

OTHER PUBLICATIONS

S. Noda, et al., "A Simple Combinatorial Method Aiding Research on Single-Walled Carbon Nanotube Growth on Substrates", *Japanese Journal of Applied Physics*, 49, 2010, 7 pages.

H. Sugime, et al., "Millimeter-tall single-walled carbon nanotube forests grown from ethanol", *Carbon*, 48, 2010, pp. 2203-2211.

D. Y. Kim, et al., "Sub-millimeter-long carbon nanotubes repeatedly grown on and separated from ceramic beads in a single fluidized bed reactor", *Carbon*, 2011, pp. 1972-1979.

D. Y. Kim, et al., "Fluidized-Bed CVD for Sub-Millimeter-Long Single-Walled Carbon Nanotubes", Department of Chemical System Engineering, The University of Tokyo, 10th International Conference on the Science and Application of Nanotubes, Jun. 22, 2009.

D. Y. Kim, et al., "Sub-Millimeter-Long Single-Walled Carbon Nanotubes Synthesized by Fluidized Bed", Department of Chemical System Engineering, The University of Tokyo, The 74th Annual Meeting of the Society of Chemical Engineers, Mar. 18, 2009.

D. Y. Kim, et al., "Fluidized Bed Synthesis of Sub-Millimeter-Long Single-Walled Carbon Nanotubes", Department of Chemical System Engineering, The University of Tokyo, The 36th Fullerene-Nanotubes General Symposium, Meijo University, Mar. 4, 2009.

S. Noda, "SWCNT Growth on Substrates Studied by a Combinatorial Method", Department of Chemical System Engineering, The University of Tokyo, The 36th Fullerene-Nanotubes General Symposium, Meijo University, Mar. 2, 2009.

Chinese Official Action dated Aug. 14, 2013, for CN Application No. 201080039891.1.

European Search Report dated Aug. 7, 2013, in connection with European Patent Application No. 10815416.2.

JP Office Action; JP Patent Application No. P2011-530870 dated Sep. 16, 2014.

* cited by examiner (a)

(b)

(a)

(b)

(c)

(a)

(b)

METHOD FOR SIMULTANEOUSLY PRODUCING CARBON NANOTUBES AND HYDROGEN, AND DEVICE FOR SIMULTANEOUSLY PRODUCING CARBON NANOTUBES AND HYDROGEN

TECHNICAL FIELD

The present invention relates to a method for simultaneously producing carbon nanotubes and hydrogen and an apparatus for simultaneously producing carbon nanotubes and hydrogen. More particularly, the present invention relates to a production method for mass-producing carbon nanotubes having various structures at a low cost and on a large scale and simultaneously producing hydrogen and an apparatus for simultaneously producing carbon nanotubes and hydrogen, used for the production method.

BACKGROUND ART

Carbon nanotubes are a material having a structure in which graphene sheets are rolled into a cylindrical shape and having a one-dimensional structure having a very large aspect ratio (see Non Patent Literature 1). The carbon nanotubes are known to have mechanically excellent strength and flexibility, semiconducting and metallic conductivity, and further, chemically very stable properties. For methods for producing carbon nanotubes, an arc discharge method, a laser vaporization method, a chemical vapor deposition method (hereinafter, referred to as a CVD method), and the like are reported. Particularly, the CVD method is a synthesis method that receives attention as a synthesis method suitable for mass production, continuous operation, and higher purity (see "Basics and Applications of Carbon Nanotubes" jointly edited by Riichiro Saito and Hisanori Shinohara, BAIFU-KAN, published in 2004).

Particularly, single-walled carbon nanotubes (hereinafter, referred to as "SWCNTs") have been confirmed to exhibit metallic properties or semiconducting properties, depending on the way of rolling and their diameter, and applications to electrical and electronic devices and the like have been expected. For the synthesis of SWCNTs, a catalytic CVD method in which nanotubes are grown (for example, see Non Patent Literature 2) has become a mainstream. This catalytic CVD method uses nanoparticles of metal as a catalyst. And, while a carbon source which is a gas is fed, the carbon source is pyrolyzed at high temperature to grow nanotubes from the nanoparticles of metal, the catalyst. At this time, the nanotubes are produced using the catalyst, which is the nanoparticles, in a gas phase-dispersed state (an A method). In addition, there is also a method using the catalyst, which is the nanoparticles, in a substrate-supported state (a B method). The A method and the B method each have advantages and disadvantages.

[Regarding Existing SWCNT Production Methods]

The outline of the A method of the gas phase-dispersed catalyst is illustrated in FIG. 14. In this method, a catalyst source and a carbon source are simultaneously fed into an externally heated reactor to perform the synthesis of nanotubes. Examples of typical synthesis methods classified into this A method include a HiPco method (for example, see Non Patent Literature 3). This A method can effectively use the three-dimensional space of the reactor. But, since the catalyst is entrained in a reaction gas, time that the catalyst remains in the reactor is short, and the catalyst is mixed into the nanotubes, a product. In addition, since the nanoparticles of the catalyst are as small as several nm, and aggregation is fast, it is difficult to increase the spatial concentration of the catalyst, and nanotube productivity per L of reactor volume is about 1 g/day.

The outline of the B method of the substrate-supported catalyst is illustrated in FIG. 15. In this B method, the catalyst is supported on a substrate, and a carbon source is fed onto the catalyst to grow nanotubes on the catalyst. Super Growth method (for example, see Non Patent Literature 4) and the like are classified as this B method, and its typical synthesis methods. In this B method, fast nanotube growth is possible. For example, fast growth at 2.5 mm/10 min is performed (Non Patent Literature 4). In addition, the catalyst is fixed on the substrate, and thus, the catalyst is prevented from being mixed into the synthesized nanotubes. But, since in the reactor, only a two-dimensional space which is a plane can be used, space use in the reactor is poor, compared with the A method.

Further, in the B method, a separation step for the separation of the synthesized nanotubes is necessary. In the case of the mass production of nanotubes, the repeated use of a substrate with a catalyst is indispensable, and this technique has not been established yet. There are many patent literatures in which carbon nanotubes are synthesized with a fluidized bed by the B method, using particles, instead of the substrate, for the fixing of the catalyst. For example, in Patent Literature 1, an apparatus for producing a tubular carbon substance is disclosed. Here, a fluidized-bed reaction furnace in which carbon nanotubes are continuously produced is disclosed (see the paragraph [0007] of Patent Literature 1).

Further, examples of techniques for producing carbon nanotubes, using a fluidized bed, include a CoMoCAT (registered trademark) production method (URL: http://www.ou.edu/engineering/nanotube/comocat.html). This production technique is a method of contacting a catalyst containing a group VIII metal, such as cobalt (Co), or a group VIa metal, such as molybdenum (Mo), with a carbon-containing gas to produce carbon nanotubes, and has been developed by the University of Oklahoma in the United States, and put to practical use by SouthWest NanoTechnologies Inc. Patent Literatures 2 to 10 are U.S. Patents regarding this technique for producing carbon nanotubes, a list of patents that the University of Oklahoma in the United States possesses.

In these synthesis methods with a fluidized bed, a catalyst is supported on support particles of porous silica or the like to synthesize nanotubes, the nanotubes are removed together with the support particles from a fluidized-bed apparatus, and the support particles and the catalyst are dissolved with an acid or the like to recover the nanotubes. But, the support particles with catalyst particles are used only once and then thrown away, the step of removing the support and the catalyst from the nanotubes is complicated, and operation is batch-wise and productivity is not high, and therefore, the price of SWCNTs is 50000 yen/g or more and is very expensive.

In addition, in recent years, demand for hydrogen ($H_2$) as clean energy has been increasing. Therefore, methods for efficiently producing hydrogen have been studied. As conventional methods for producing hydrogen, a method of producing hydrogen by a steam reforming reaction, using hydrocarbon as a source, is common (for example, see Patent Literatures 11 and 12).

CITATION LIST

Patent Literature

Patent Literature 1: Japanese Patent Application Laid-Open Publication No. 2003-286015

Patent Literature 2: U.S. Pat. No. 6,333,016, "Method of Producing Nanotubes"
Patent Literature 3: U.S. Pat. No. 6,413,487, "Method and Apparatus for Producing Nanotubes"
Patent Literature 4: U.S. Pat. No. 6,919,064, "Process and Apparatus for Producing Single-Walled Carbon Nanotubes"
Patent Literature 5: U.S. Pat. No. 6,955,800, "Method and Apparatus for Producing Single-Walled Carbon Nanotubes"
Patent Literature 6: U.S. Pat. No. 6,962,892, "Metallic Catalytic Particle for Producing Single-Walled Carbon Nanotubes"
Patent Literature 7: U.S. Pat. No. 6,994,907, "Carbon Nanotube Product Comprising Single-Walled Carbon Nanotubes"
Patent Literature 8: U.S. Pat. No. 7,094,386, "Method of Producing Single-Walled Carbon Nanotubes/Ceramic Composites"
Patent Literature 9: U.S. Pat. No. 7,153,903, "Carbon Nanotube-Filled Composites Prepared by In-situ Polymerization"
Patent Literature 10: U.S. Pat. No. 7,279,247, "Carbon Nanotube Pastes and Methods of Use"
Patent Literature 11: Japanese Patent Application Laid-Open Publication No. 8-225302
Patent Literature 12: Japanese Patent No. 3035038

Non Patent Literature

Non Patent Literature 1: S. Iijima, Nature 354, 56 (1991).
Non Patent Literature 2: H. Dai, A. G Rinzler, P. Nikolaev, A. Thess, D. T. Colbert, and R. E. Smalley, Chem. Phys. Lett. 260, 471 (1996).
Non Patent Literature 3: HiPco Method: M. J. Bronikowski, P. A. Willis, D. T. Colbert, K. A. Smith, and R. E. Smalley, J. Vac. Sci. Technol. A 19, 1800 (2001).
Non Patent Literature 4: K. Hata, D. N. Futaba, K. Mizuno, T. Namai, M. Yumura, and S. Iijima, Science 306, 1362 (2004).

SUMMARY OF INVENTION

Technical Problem

In a market, the quote of SWCNTs is more expensive than that of precious metals. The high price of SWCNTs is a large obstacle to applications using the mechanical characteristics and conductive properties of SWCNTs. When the production of carbon nanotubes becomes possible on a large scale and at low cost, it can be expected that various applications can be rapidly achieved. Therefore, innovation in the techniques for producing carbon nanotubes, and a lower price of the production cost of the carbon nanotubes are essential. In the method for synthesizing carbon nanotubes, using a support, which is the B method, a catalyst is supported at low temperature, the temperature is raised to synthesize carbon nanotubes, and the temperature is lowered to recover the carbon nanotubes.

Most time is spent for this raising and lowering of the temperature, and therefore, productivity is extremely low. In catalyst spray synthesis using no support, which is the A method, catalyst support, the growth of carbon nanotubes, and the recovery of the carbon nanotubes are all simultaneously performed, and therefore, temperature is constant. In this A method, both the catalyst and the carbon nanotubes are suspended in a gas phase, and flow out, together with a gas flow emitted from the reactor. Disadvantages are that the catalyst is suspended and therefore the number density of the catalyst cannot be increased, and the carbon nanotubes and the catalyst are recovered mixed.

In Patent Literature 1, a gas for fluidization, a carbon source gas, and a catalyst source gas are fed by providing separate feed parts. In Patent Literature 1, it seems that it is assumed that these three types of gases are continuously fed, and gas switching operation is not mentioned at all. Further, in the method of Patent Literature 1, a catalyst is attached to carbon nanotubes, and therefore, impurities are mixed into a product. Further, in the method of Patent Literature 1, carbon deposits remaining in a fluidized bed cannot be removed and are accumulated. As a result, before many carbon nanotubes are obtained, particles which are fluidized media, are covered with carbon, and become unusable.

As described above, carbon nanotubes having high purity cannot be made in the conventional production methods with a fluidized bed. Further, productivity is low. Since carbon nanotube synthesis and catalyst support are simultaneously performed, a high degree of control of the catalyst is also difficult.

On the other hand, problems of the methods for producing hydrogen described in Patent Literatures 11 and 12 are that much energy is required to make hydrogen, and carbon dioxide and carbon monoxide are generated during hydrogen production.

The present invention has been made based on technical background as described above, and achieves the following objects. It is an object of the present invention to provide a method and an apparatus for simultaneously producing carbon nanotubes and hydrogen, in which carbon nanotubes can be produced on a large scale and at low cost, and simultaneously, hydrogen ($H_2$) can be produced.

It is another object of the present invention to provide a method for simultaneously producing carbon nanotubes and hydrogen that has both the advantages of a gas phase-dispersed catalyst and a substrate-supported catalyst by spreading a substrate-supported catalyst to the three-dimensional space of a CVD reactor.

It is a further object of the present invention to provide a method for simultaneously producing carbon nanotubes and hydrogen, in which while a reactor is kept in a heated state, the production of carbon nanotubes and hydrogen is pseudo-continuous, specifically, the support of a catalyst, the growth of carbon nanotubes, the synthesis of hydrogen, the recovery of the carbon nanotubes, and the recovery of the hydrogen are repeatedly performed using a support.

Solution to Problem

In order to achieve the above objects, the present invention provides a method for simultaneously producing carbon nanotubes and hydrogen, in which using a carbon source containing carbon atoms and hydrogen atoms and being decomposed when heated, and a catalyst for producing carbon nanotubes and $H_2$ from the carbon source, the above carbon nanotubes are synthesized on a support in a heated state, placed in a reactor, and simultaneously, the above $H_2$ is synthesized from the above carbon source, the method comprising a synthesis step of flowing a source gas containing the above carbon source over the above support, on which the above catalyst is supported, to synthesize the above carbon nanotubes on the above support and simultaneously synthesize the above $H_2$ in a gas flow. According to such a production method, carbon nanotubes can be produced on a large scale and at low cost, and simultaneously, hydrogen ($H_2$) can be produced. Main constituents in the carbon source when the carbon nanotubes are produced are a carbon atom and a hydrogen atom, and according to the present invention, it is possible to change the former into carbon nanotubes and the latter into $H_2$ to recover both as useful materials.

In the method for simultaneously producing carbon nanotubes and hydrogen according to the present invention, it is preferred that a feed amount of the above source gas in the above synthesis step is 0.01 to 100 m³/s per m³ of a volume of the above reactor, in terms of improving the productivity of carbon nanotubes and hydrogen ($H_2$) per the reactor volume.

In the method for simultaneously producing carbon nanotubes and hydrogen according to the present invention, it is preferred that the above support has a gas flow path having a width of 0.03 mm or more and 30 mm or less within or around the support, in terms of both reacting much of the carbon source to improve the yield of carbon nanotubes and hydrogen ($H_2$), and flowing the carbon source at high speed to improve the productivity of carbon nanotubes and hydrogen ($H_2$).

In the method for simultaneously producing carbon nanotubes and hydrogen according to the present invention, it is preferred that the above support is a structure having one shape selected from among a powder form, a bead form, a honeycomb form, a porous form, a fiber form, a tube form, a wire form, a net form, a grid form, a sponge form, a plate form, and a layer form, in terms of both reacting much of the carbon source to improve the yield of carbon nanotubes and hydrogen ($H_2$), and flowing the carbon source at high speed to improve the productivity of carbon nanotubes and hydrogen ($H_2$).

In the method for simultaneously producing carbon nanotubes and hydrogen according to the present invention, it is preferred that the above support is in a powder form or a bead form, and the above synthesis step is performed in a fluidized bed state, in terms of both reacting much of the carbon source to improve the yield of carbon nanotubes and hydrogen ($H_2$), and flowing the carbon source at high speed to improve the productivity of carbon nanotubes and hydrogen ($H_2$).

In the method for simultaneously producing carbon nanotubes and hydrogen according to the present invention, it is preferred that the above catalyst comprises a carrier layer and catalyst particles. At this time, it is preferred that the above catalyst particles comprise at least one element selected from the group consisting of V, Cr, Mn, Fe, Co, Ni, Cu, Zn, Mo, W, and Au. In addition, it is preferred that the above carrier layer comprises at least one element selected from the group consisting of Si, Al, Mg, Zr, Ti, O, N, C, Mo, Ta, and W.

In the method for simultaneously producing carbon nanotubes and hydrogen according to the present invention, it is preferred that a source of the above support comprises at least one element selected from the group consisting of Si, Al, Mg, Zr, Ti, O, N, C, Mo, Ta, and W. At this time, the support can also play a role as a catalyst carrier, and it is also preferred that the above support on which the above catalyst is supported is one in which the catalyst particles are supported on the above support also playing the role of a catalyst carrier.

It is preferred that the method for simultaneously producing carbon nanotubes and hydrogen according to the present invention comprises a catalyst supporting step of flowing a catalyst source, which is a source of the above catalyst, over the above support in the heated state to support the above catalyst on the above support, before the above synthesis step.

It is preferred that the method for simultaneously producing carbon nanotubes and hydrogen according to the present invention comprises a separation step of flowing a separation gas over the above support, on which the above carbon nanotubes are synthesized, to separate the above carbon nanotubes from the above support into the above separation gas; and a removal step of flowing an oxidizing gas over the above support after the above carbon nanotubes are separated, to oxidize and remove carbon remaining on the above support, wherein the steps in the method for simultaneously producing carbon nanotubes and hydrogen are repeatedly performed by switching the gases fed to the above reactor, with the above support kept in the heated state. At this time, it is preferred that the method for simultaneously producing carbon nanotubes and hydrogen according to the present invention comprises a carbon nanotube recovery step of recovering the carbon nanotubes from an emission gas emitted from the above reactor; and a hydrogen recovery step of recovering the $H_2$ from the above emission gas.

It is also preferred that the method for simultaneously producing carbon nanotubes and hydrogen according to the present invention comprises a catalyst supporting step of attaching a catalyst source, which is a source of the above catalyst, to the above support, introducing the above support, to which the above catalyst source is attached, into the above reactor, and heat-treating the above support, to which the above catalyst source is attached, in the above reactor to support the above catalyst on the above support, before the above synthesis step. In addition, it is also preferred that the method for simultaneously producing carbon nanotubes and hydrogen according to the present invention comprises an introduction step of introducing the above support, on which the above catalyst is supported, into the above reactor, before the above synthesis step.

It is preferred that when the method for simultaneously producing carbon nanotubes and hydrogen according to the present invention comprises the catalyst supporting step or introduction step, the method comprises a support recovery step of recovering the above support, on which the above carbon nanotubes are synthesized, from the above reactor, after the above synthesis step, wherein the steps in the method for simultaneously producing carbon nanotubes and hydrogen are repeatedly performed. At this time, it is preferred that the method for simultaneously producing carbon nanotubes and hydrogen according to the present invention comprises a carbon nanotube recovery step of separating and recovering the carbon nanotubes from the above support on which the above carbon nanotubes are synthesized; and a hydrogen recovery step of recovering the $H_2$ from an emission gas emitted from the above reactor.

In addition, it is also preferred that when the method for simultaneously producing carbon nanotubes and hydrogen according to the present invention comprises the catalyst supporting step or introduction step, the method comprises a separation step of flowing a separation gas over the above support, on which the above carbon nanotubes are synthesized, to separate the above carbon nanotubes from the above support into the above separation gas; and a support recovery step of recovering the above support after the above carbon nanotubes are separated, from the above reactor, wherein the steps in the method for simultaneously producing carbon nanotubes and hydrogen are repeatedly performed. At this time, it is preferred that the method for simultaneously producing carbon nanotubes and hydrogen according to the present invention comprises a carbon nanotube recovery step of recovering the carbon nanotubes from an emission gas emitted from the above reactor; and a hydrogen recovery step of recovering the $H_2$ from the above emission gas.

The present invention also provides an apparatus for simultaneously producing carbon nanotubes and hydrogen, comprising a carbon source feeding apparatus for feeding a carbon source containing carbon atoms and hydrogen atoms and being decomposed in a heated state; a catalytic reaction apparatus for decomposing the above carbon source by a catalyst supported on a support to synthesize carbon nanotubes on the above support and synthesize $H_2$ in a gas flow; a carbon nanotube recovery apparatus for recovering the above carbon nanotubes from the above catalytic reaction apparatus; and a $H_2$ recovery apparatus for recovering the above $H_2$ from the above catalytic reaction apparatus. According to such a production apparatus, carbon nanotubes can be produced and recovered on a large scale and at low cost, and simultaneously, hydrogen ($H_2$) can be produced and recovered.

In the apparatus for simultaneously producing carbon nanotubes and hydrogen according to the present invention, it is preferred that the above carbon nanotube recovery apparatus recovers the above carbon nanotubes together with the above support in a state in which the above carbon nanotubes are held on the above support, and the above $H_2$ recovery apparatus recovers the above $H_2$ from an emission gas emitted from the above catalytic reaction apparatus.

In addition, it is also preferred that the apparatus for simultaneously producing carbon nanotubes and hydrogen according to the present invention further comprises a separation gas feeding apparatus for feeding a separation gas for separating the above carbon nanotubes from the above support into a gas flow, wherein the above carbon nanotube recovery apparatus recovers the above carbon nanotubes from an emission gas emitted from the above catalytic reaction apparatus, and the above $H_2$ recovery apparatus recovers the above $H_2$ from the above emission gas. At this time, it is preferred that the apparatus for simultaneously producing carbon nanotubes and hydrogen according to the present invention further comprises an oxidizing gas feeding apparatus for feeding an oxidizing gas for removing carbon remaining on the above support from which the above carbon nanotubes are separated.

It is preferred that the apparatus for simultaneously producing carbon nanotubes and hydrogen according to the present invention further comprises a catalyst source feeding apparatus for feeding a catalyst source, which is a source of the above catalyst, in a gas state onto the above support.

In addition, it is also preferred that the apparatus for simultaneously producing carbon nanotubes and hydrogen according to the present invention further comprises a support feeding apparatus for feeding the above support, on which a catalyst source which is a source of the above catalyst is supported, to the above catalytic reaction apparatus.

Further, it is also preferred that the apparatus for simultaneously producing carbon nanotubes and hydrogen according to the present invention further comprises a support feeding apparatus for feeding the above support, on which the above catalyst is supported, to the above catalytic reaction apparatus.

It is preferred that the apparatus for simultaneously producing carbon nanotubes and hydrogen according to the present invention further comprises a switching apparatus for switching feed of any two or more of the above carbon source, the above separation gas, the above catalyst source, the above oxidizing gas, and the above support.

[Definition of Terms]

Terms used in the description and claims of the present invention will be defined.

A "carbon nanotube" refers to a fine structure having a structure in which a graphene sheet is rolled into a cylindrical shape.

A "support" is a structure for holding a catalyst, a catalyst carrier (carrier layer) (definition will be described later), and the like in a reactor, and is made of a solid material. The catalyst can be supported, for example, by gasifying the catalyst source and contacting the catalyst source gas with the support. Alternatively, the catalyst can be supported on the support by attaching the source of the catalyst to the support and heat-treating them.

A "catalyst" is supported on a support and means a general catalyst. When a carbon source is fed to the "catalyst" to synthesize carbon nanotubes, the "catalyst" serves the functions of the mediation, promotion, efficiency, and the like of the synthesis of carbon nanotubes, and thus, carbon nanotubes are synthesized from the carbon material. In addition, simultaneously with the carbon nanotubes being synthesized by the functions of the "catalyst," hydrogen ($H_2$) is also synthesized. The "catalyst" means a material having the role of taking in a carbon source and discharging carbon nanotubes and hydrogen. Further, the "catalyst" means nanoparticles having a size on the order of nanometers.

A "catalyst carrier" (carrier layer) is a material to which the nanoparticles of a catalyst are attached. The "catalyst carrier" is formed on a support, and a catalyst which is nanoparticles of metal is supported on the "catalyst carrier". The support can also serve the function of the catalyst carrier.

"The synthesis of carbon nanotubes" refers to that carbon grows while making a tubular structure on a catalyst. As a synonym for the synthesis of carbon nanotubes, "the growth of carbon nanotubes" is used.

A "source gas" is a gas comprising a carbon source containing a carbon atom and a hydrogen atom and being decomposed in a heated state, and comprises, for example, the carbon source and a carrier gas.

A "reactor" is an apparatus in which a support is placed, and is an enclosed apparatus to which a feed pipe for feeding gas flows, such as the source of a catalyst carrier, the source of a catalyst, a source gas comprising a carbon source, a carrier gas, and a separation gas, and a emission pipe for a gas flow after synthesis being emitted are connected.

The "switching" of gas flows refers to feeding the source of a catalyst carrier, the source of a catalyst, a source gas comprising a carbon source, a separation gas, an oxidizing gas, and the like to a reactor, temporally divided.

"Steps" in a method for producing carbon nanotubes and hydrogen include at least a synthesis step, and further include a catalyst supporting step, a support introduction step, the step of separating a support and carbon nanotubes, the step of removing residual carbon on the support, a support recovery step, a carbon nanotube recovery step, and a hydrogen recovery step when performing the steps.

"Repetition" refers to, considering, as one cycle, a series of steps for producing carbon nanotubes and hydrogen, that is, steps carried out among the support of a catalyst carrier, the support of a catalyst, the introduction of a support on which the catalyst is supported, the synthesis of carbon nanotubes and hydrogen, the recovery of the support, the separation and recovery of the carbon nanotubes, the recovery of the hydrogen, the removal of carbon remaining on the support, and the like, repeatedly performing the cycle. When the catalyst supporting step is performed, at least the support of the catalyst and the synthesis of carbon nanotubes and hydrogen are temporally divided, and repeatedly performed including the separation and recovery of the carbon nanotubes.

"The separation of the carbon nanotubes" refers to separating the carbon nanotubes synthesized on the catalyst, from the catalyst and the support, for example, by a separation gas flow. The source gas can also serve as the separation gas. In addition, the separation of the carbon nanotubes from the support may be performed after the support to which the carbon nanotubes are attached is recovered from the reactor.

"The recovery of the carbon nanotubes" means that, for example, when the carbon nanotubes are separated from the support by the above separation gas flow, only the carbon nanotubes are separated and recovered from the separation gas flow (emission gas) emitted from the reactor.

"The recovery of the hydrogen" means that after the source gas is flowed to perform the synthesis of carbon nanotubes and hydrogen, only the hydrogen is separated and recovered from the emission gas emitted from the reactor.

"The regeneration of the support" refers to regularly or irregularly treating the catalyst supported on the support, which is degraded, deactivated, or exhausted by the production of carbon nanotubes and hydrogen, during the production to reproduce a catalytic function. Specifically, when the catalytic function decreases due to the carbonization, oxidation, and the like of catalyst particles, carbon is removed from the catalyst particles by oxidation treatment, and then, the catalyst particles are converted into a reduced state by reduction treatment to reproduce the catalytic function. However, a problem is that the catalyst particles coarsen and remain, and there is a limit to the regeneration of the catalyst. Therefore, "the resupport of a catalyst" defined next is included in the regeneration treatment of the support.

"The resupport of a catalyst" is supporting a carrier on the coarsened catalyst particles to cover the coarsened catalyst particles, and further supporting catalyst particles again. By performing the resupport of a catalyst, carbon nanotubes can be repeatedly synthesized on the support.

Advantageous Effects of Invention

With the method for simultaneously producing carbon nanotubes and hydrogen according to the present invention, the following effects are achieved. That is, with the method for simultaneously producing carbon nanotubes and hydrogen according to the present invention, carbon nanotubes can be produced on a large scale and at low cost, and simultaneously, hydrogen can be efficiently produced. In addition, the production method of the present invention can use a support in which area per unit volume is large, and therefore, space utilization rate is high, and the production method of the present invention is suitable for the mass production of carbon nanotubes. In addition, the structure of such a support suppresses pressure loss and is suitable for feeding a gas at high speed. Therefore, it is possible to easily separate and recover the carbon nanotubes from the support by an unsteady gas pulse or a steady gas flow, and suppress the mixing of the catalyst into the produced carbon nanotubes.

In addition, by providing a method for resupporting a catalyst on the support, it is possible to repeatedly synthesize carbon nanotubes and hydrogen. With the support remaining in a heated state, a catalyst is supported, carbon nanotubes are grown and hydrogen is synthesized, and the carbon nanotubes and the hydrogen are recovered, and this cycle is repeated, and therefore, it is not necessary to raise and lower the temperature of the reactor each time the synthesis and the recovery are performed, its time can be saved, productivity can be largely improved, and energy consumption accompanying the raising and lowering of the temperature can be suppressed.

In addition, in the production method of the present invention, by placing the support in a heated atmosphere and repeatedly performing the above cycle, flowing out of the catalyst and the carbon nanotubes suspended in a gas phase, together with an emission gas, as in conventional art, can be improved. Therefore, the disadvantages that the catalyst is suspended and therefore the number density of the catalyst cannot be increased, and that the carbon nanotubes and the catalyst are recovered mixed, are improved. And, the production efficiency of carbon nanotubes improves dramatically, compared with the conventional production techniques.

BRIEF DESCRIPTION OF DRAWINGS

FIG. 2(a) is a case where the support is particles, and FIG. 2(b) is a case where the support is a fixed substrate.

DESCRIPTION OF EMBODIMENTS

Figure 1:
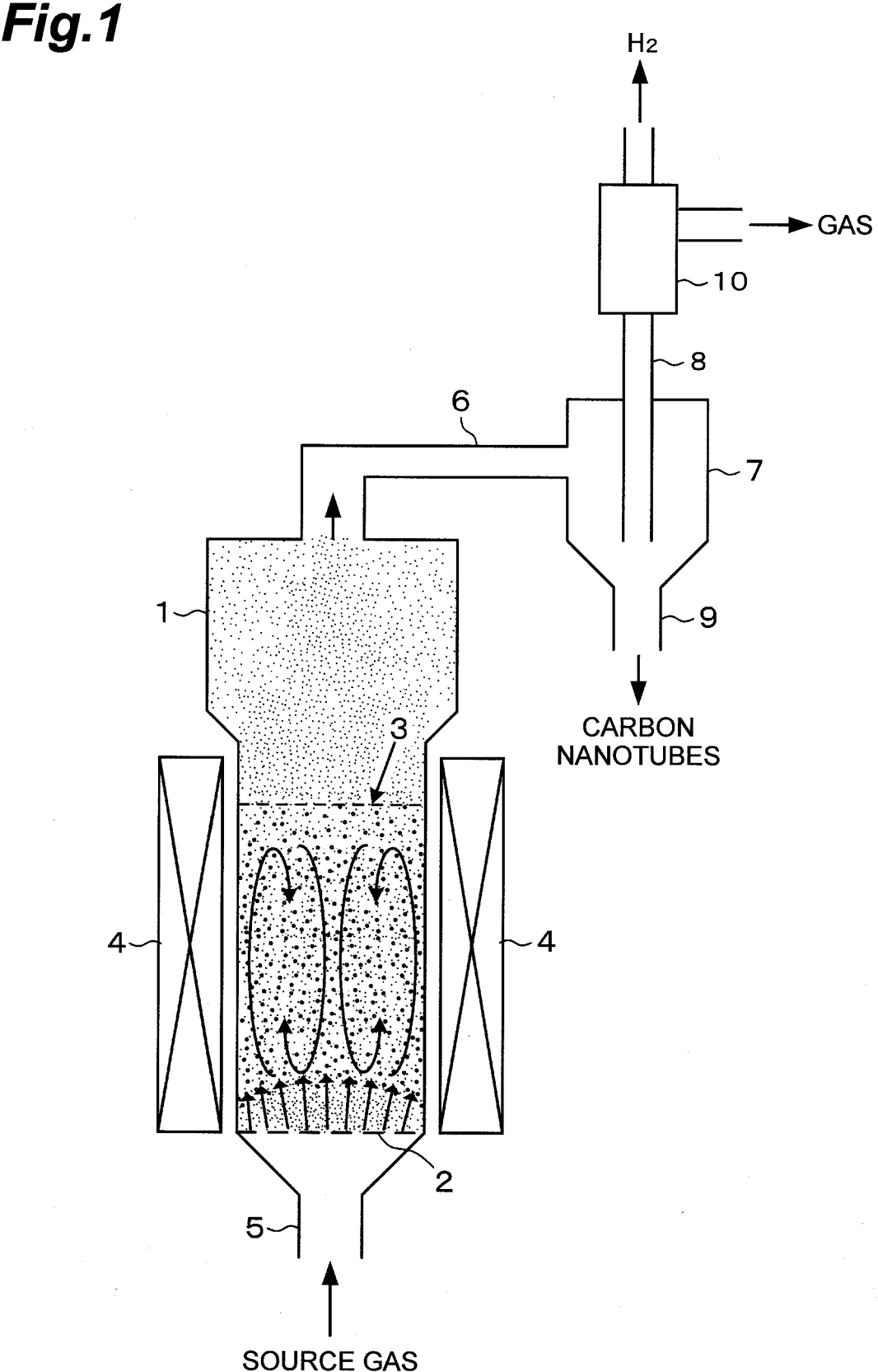
FIG. 1 is a schematic diagram showing the outline of an apparatus for simultaneously producing carbon nanotubes and hydrogen in an embodiment of the present invention.

Preferred embodiments of the present invention will be described below in detail, referring to the drawings in some cases. In the drawings, like numerals refer to like or corresponding parts, and redundant description is omitted. In addition, dimensional ratios in the drawings are not limited to ratios shown.

The production method of the present invention is one in which by flowing a source gas over a support, the production of carbon nanotubes and the synthesis of hydrogen are performed, and the carbon nanotubes and the hydrogen are simultaneously produced.

In addition, a preferred production method of the present invention is one in which while the temperature of a reactor is kept at high temperature, the synthesis and separation and recovery of carbon nanotubes, the synthesis and recovery of hydrogen, and the resupport of a catalyst are repeatedly performed to pseudo-continuously synthesize carbon nanotubes and hydrogen. Specifically, using a support, catalyst support, carbon nanotube growth, separation of the carbon nanotubes, and synthesis and recovery of hydrogen are repeated to pseudo-continuously produce carbon nanotubes and hydrogen.

Main elements constituting a method for producing carbon nanotubes and hydrogen according to the present invention will be described below for each element.

[General]

The method for producing carbon nanotubes and hydrogen according to the present invention is a method of performing the synthesis of carbon nanotubes and hydrogen (synthesis step) by using a support on which a catalyst is supported, and flowing a source gas over the support. In addition, one preferred embodiment of the method for producing carbon nanotubes and hydrogen according to the present invention is a method of performing the support of a catalyst on a support (a catalyst supporting step), the synthesis of carbon nanotubes and hydrogen (a synthesis step), the separation of the carbon nanotubes (a separation step), the recovery of the carbon nanotubes (a carbon nanotube recovery step), and the recovery of the hydrogen (a hydrogen recovery step), preferably with the support kept in a heated state, and is more preferably a method of repeatedly performing the steps. As the support, one on which a catalyst is previously supported may be prepared, and in such a case, the catalyst supporting step may be omitted. The present invention is not a continuous method in which catalyst support, the synthesis of carbon nanotubes and hydrogen, the recovery of the carbon nanotubes, and the recovery of the hydrogen are continuously performed. The above preferred production method of the present invention is one in which the synthesis of carbon nanotubes and hydrogen is repeatedly performed changing the steps while switching gas flows, and the above preferred production method of the present invention can be said to be pseudo-continuous synthesis. In the present invention, preferably, carbon nanotubes are synthesized by a thermal CVD method. This thermal CVD method is a method of forming a solid material by chemically reacting a source vaporized at high temperature, in the gas phase of the vapor or on a substrate surface.

A method of giving energy causing this chemical reaction, in the form of thermal energy, from a substrate or a reaction container wall is known as the thermal CVD method. Particularly, it is desired to, depending on a difference in the state of the support used, change the way of mounting the support. When a structure in a honeycomb form, a porous form, a fiber form, a tube form, a wire form, a net form, a grid form, a sponge form, a plate form, a layer form, or the like is used for the support, the support is fixed and mounted in a reactor, and heated to high temperature. A catalyst source and the like are fed to its surface to perform the support of a catalyst on the surface of the support, and a carbon source and the like are fed to perform the synthesis of carbon nanotubes and hydrogen.

When particles in a powder form, a bead form, or the like are used for the support, the particles are filled into the reactor. By flowing gases, such as the catalyst source and the carbon source, through a particle layer comprising these particles, the support of the catalyst and the synthesis of carbon nanotubes are performed on the surface of the particles in a fixed bed state or a fluidized bed state. Particularly, in the case of a fluidized bed thermal CVD method, the support particles form a fluidized state in the reactor by a carrier gas and the like. The catalyst source, the carbon source, and the like are fed into this atmosphere to perform the support of the catalyst and the synthesis of carbon nanotubes on the surface of the support. In this case, as the support, particles having such weight that the particles are not emitted together with these gas flows from the reactor can be used.

In the case of the fluidized bed thermal CVD method, it is possible to adopt any of a method of recovering carbon nanotubes grown on the support particles, together with the support particles, a method of separating carbon nanotubes grown on the support particles from the support particles by a separation gas flow, and separating and recovering the carbon nanotubes from an emission gas, and a method in which carbon nanotubes growing on the support particles peel off while growing, and synthesis and separation are simultaneously performed. On the other hand, hydrogen is constantly synthesized in a gas flow, and therefore separated and recovered from the emission gas. As the reactor, a gas flow bed reactor, a fixed bed reactor, a moving bed reactor, a fluidized bed reactor, or the like can be used. The support of the catalyst and the synthesis of carbon nanotubes are preferably performed temporally divided. Thus, it is possible to suppress the mixing of the catalyst, the catalyst source, and the like into the product. All of a carbon source, a catalyst source, a carrier source, an oxidizing gas, and a carrier gas fed to the reactor, or part of them can be fed to the reactor at ordinary temperature. In addition, all of the carbon source, the catalyst source, the carrier source, the oxidizing gas, and the carrier gas fed to the reactor, or part of them can also be fed in a heated state. In addition, feeding gases may be heated by heat exchange with the emission gas emitted from the reactor. Heating the feeding gases can prevent a decrease in the temperature of the support.

When the step of separating the carbon nanotubes from the support particles by the separation gas flow is adopted, the resupport of a catalyst can be performed after residual carbon, such as carbon nanotubes which can not be separated, and graphite and amorphous carbon which are by-products, is removed by the oxidation treatment of the support after the separation of the carbon nanotubes. In addition, the synthesized carbon nanotubes should be recovered by recovery means, such as a cyclone type, a filter type, a thermal migration type, or a scrubber type, after separated from the support by the separation gas.

In addition, the synthesized hydrogen ($H_2$) is contained in the emission gas and emitted from the reactor. This hydrogen contained in the emission gas can be separated and recovered by a general hydrogen recovery method. Examples of the hydrogen recovery method include a membrane separation method, a chemical adsorption method, a physical adsorption method, a cryogenic separation method, and an adsorbent method. Among these, the membrane separation method is preferred as the hydrogen recovery method. Examples of a hydrogen separation membrane used in the membrane separation method include membranes of porous materials, palladium, alloy systems, or the like. The recovery of the hydrogen may be performed before the separation and recovery of the carbon nanotubes, or may be performed after the separation and recovery of the carbon nanotubes.

In addition, in the production method of the present invention, a method of supporting the catalyst on the support by attaching the catalyst source to the support by a liquid-phase supporting method or a gas-phase supporting method and firing them may be adopted. In this case, the firing may be performed in the reactor, or it is possible to separately prepare a firing furnace, perform the support of the catalyst on the support outside the reactor, and then introduce this support, on which the catalyst is supported, into the reactor.

In addition, in the production method of the present invention, it is not always necessary to separate the carbon nanotubes from the support in the reactor. In other words, it is possible to recover the support, to which the carbon nanotubes are attached, from the reactor, and separate and recover the carbon nanotubes from the support outside the reactor. A separation method at this time is not particularly limited.

[Reaction Temperature]

The above-described steps and their repetition are preferably performed in a state in which the support is held at a temperature of 100° C. or more and 1200° C. or less. Further, in the steps and their repetition, a fluctuation in the temperature of the support is preferably 500° C. or less. The preferred lower limit of the temperature of the support is 100° C. because it is intended not to introduce water in a liquid state into the reactor in the steps, such as the support of the catalyst, and the separation of the carbon nanotubes. This is because if water in a liquid state is used, temporal and thermal losses are very large to prepare carbon nanotube synthesis conditions. The preferred upper limit of the temperature of the support is 1200° C. because it is intended to set the temperature of the support to a temperature at which the carbon source is pyrolyzed into soot, or less. This temperature is different depending on the type of the carbon source. In addition, in terms of more efficiently synthesizing carbon nanotubes and hydrogen, the support is more preferably held at a temperature of 600° C. or more and 1000° C. or less.

Here, several temperatures of the pyrolysis are illustrated. When the carbon source is an aromatic or methane having low reactivity, the temperature of the pyrolysis is about 1200° C. In the case of other alkanes, the temperature of the pyrolysis is about 1000° C. In the case of alcohols, alkenes, and alkynes having high reactivity, the temperature of the pyrolysis is about 900° C. The temperature fluctuation of the support is preferably lower, but a fluctuation of about 500° C. or less occurs due to the burning of the residual carbon, and the like. With a temperature fluctuation of about 500° C. or less, a temporal loss is also small. In addition, in terms of more efficiently synthesizing carbon nanotubes and hydrogen, the temperature fluctuation of the support is more preferably controlled to 100° C. or less.

[Reaction Time]

When the above-described steps are repeatedly performed, the cycle of the repetition should be 10 seconds or more and within 10 hours. The time of the synthesis of carbon nanotubes and hydrogen during the cycle of the repetition should be 10% or more and 99.99% or less of the time of the repetition cycle. The time of the separation of the carbon nanotubes and catalyst resupport during the cycle of the repetition should be several tens of seconds. The time range of the synthesis of carbon nanotubes and hydrogen changes according to the purpose of how long the length of the carbon nanotubes is set. When the synthesis time is long, the synthesis of long carbon nanotubes can be performed. This synthesis time is determined by the type of the material, and the required length of the carbon nanotubes, and is not limited to the above-described values. Similarly, time required for the separation of the carbon nanotubes, the resupport of a catalyst, and the regeneration of the support is determined by the type of the material, heating temperature, and the like, and therefore is not limited to the above-described values.

[Support]

The support should be one in which the surface area of the support can be increased as much as possible. But, even if a fine structure smaller than 1 μm is formed on the support to increase the surface area of the support, the fine structure is quickly clogged with the carbon nanotubes, and it is difficult to recover the carbon nanotubes from the fine structure, and therefore, there is no substantial effect. Therefore, it is preferred that the support has a gas flow path having a width of 0.03 mm or more and 30 mm or less within or around the support.

In other words, with a flow path having a width of 0.03 mm or more and 30 mm or less, it is easy to, while keeping the exposed surface area of the support large, simultaneously flow a gas with small drag, and the recovery of the carbon nanotubes is also easy. As described above, the support should be one in which surface area per unit volume is large is good, and specifically, the support is preferably one having a specific surface area of 0.1 $mm^2/mm^3$ or more, as a surface excluding the surface of a fine structure smaller than 1 μm. Further, the support is most preferably one having a specific surface area of 1 $mm^2/mm^3$ or more and 1000 $mm^2/mm^3$ or less. In addition, the support may be, for example, a honeycomb structure known as such a structure that quadrangular pipes whose cross-sectional shape is a quadrangle are arranged.

Other than the honeycomb structure, the support may be one in which many plate materials are arranged, one in which wavy plate materials are arranged, one having such a structure that rectangular pipes whose cross-section is rectangular are arranged, or the like. In addition, the support may be one having a structure in a porous form, a fiber form, a tube form, a wire form, a net form, a grid form, a sponge form, a plate form, a layer form, or the like, and these supports should be used fixed in the reactor. Further, the support may be particles in a powder form, a bead form, or the like. In the case of particles, the particles are filled into the reactor, and used in a fixed bed state or a fluidized bed state. Particularly, when the particles are used in a fluidized bed state, the particles can be uniformly mixed, and further, the carbon nanotubes can be separated from the particles due to friction between the particles during carbon nanotube synthesis or after the synthesis, which is, particularly preferred.

For a reason that heat resistance, corrosion resistance, chemical resistance, mechanical strength properties, and the like are good, it is preferred to use ceramics for the material of the support. For the support, ceramics, such as publicly known oxide systems, nitride systems, and silicon carbide systems comprising one or more elements selected from among O, N, C, Si, Al, Zr, and Mg, should be used. However, the support is not limited to ceramics, and metal sources comprising metals or alloys comprising one or more elements selected from among W, Ta, Mo, Ti, Al, Fe, Co, and Ni, and carbon may be used. Particularly, the support is most preferably alumina beads or zirconia beads.

The heating of the above-described support should be performed adopting the following method. The support is heated to make the temperature of the catalyst high, and a source gas comprising a carbon source is fed to perform the synthesis of carbon nanotubes and hydrogen. The heating of the support can be performed by means for directly heating or indirectly heating the support. Particularly, it is preferred to use means for placing the support in a heating furnace heated to high temperature. Specifically, in the present invention, carbon nanotubes are synthesized by a thermal CVD method. This thermal CVD method is a method of forming a thin film by a chemical reaction in the gas phase of a gas or, by vaporizing a liquid source, the vapor, or on a substrate surface.

A method of giving energy causing this chemical reaction, in the form of thermal energy, from a substrate or a reaction container wall is known as the thermal CVD method. This heating method may be one in which carbon nanotubes are synthesized by heating the entire reactor by a heating furnace. In addition, carbon nanotubes may be synthesized by heating the support by the passage of electric current. In other words, carbon nanotubes may be synthesized by heating the support by the passage of electric current, instead of heating the entire reactor by a heating furnace.

[Carrier and Feed of Carrier]

A catalyst carrier (carrier layer) comprises one or more elements selected from among Si, Al, Mg, Zr, Ti, O, N, C, Mo, Ta, and W. For example, the catalyst carrier should be formed of an oxide, such as $SiO_2$, $Al_2O_3$, or MgO, a nitride, such as $Si_3N_4$ or AlN, or a carbide, such as SiC. Particularly, a complex oxide of $Al_2O_3$—$SiO_2$ is preferred. The source of the catalyst carrier is fed in a gas state to the reactor. When the source of the catalyst carrier is a liquid or a solid at ordinary temperature, it is also possible to gasify this, and feed this in a gas state to the reactor. The fed source of the catalyst carrier in the gas state contacts with the support and is supported to form the catalyst carrier on the support.

Further, when the entire reactor is heated by a heating furnace, it is also possible to directly feed the source of the catalyst carrier, which is a liquid or a solid at ordinary temperature, into the reactor. These sources are evaporated by the heat of the heated reactor. Therefore, they are fed to the support as the sources in a gas state. In addition, it is also possible to simultaneously support the catalyst carrier and the catalyst. The catalyst carrier should have an average film thickness of 1 nm or more and 100 nm or less. The resupport of a catalyst carrier is performed by feeding the source of the catalyst carrier in a gas state into a heated atmosphere, as in the support of the catalyst carrier described above. In addition, the resupport of a catalyst carrier can also be performed by simultaneously supporting a catalyst carrier and a catalyst.

Further, it is also possible to form the carrier layer or a layer of the carrier source on the support particles outside the reactor. For example, when an $Al_2O_3$ carrier is used, it is possible to form the layer of the carrier source on the support particles by using an aqueous solution of a salt comprising Al, such as a nitrate, an acetate, a chloride, or a hydroxide, immersing the support particles in the aqueous solution or applying the aqueous solution to the support particles, and then drying the aqueous solution. By introducing the support particles, on which the carrier source layer is formed, into the reactor at high temperature, the carrier source layer can be pyrolyzed to form an $Al_2O_3$ carrier layer. In addition, it is also possible to previously pyrolyze the carrier source layer, using a high-temperature container apart from the reactor, and then introduce the support particles into the reactor. Further, the layer of the carrier source may be formed, using an alcohol solution of an alkoxide of aluminum.

The catalyst should be one comprising one or more elements selected from among V, Cr, Mn, Fe, Co, Ni, Cu, Zn, Mo, W, and Au, in a component. In addition, the catalyst is formed on the above-described catalyst carrier (carrier layer) or a support also serving as a catalyst carrier. For the size of the catalyst, diameter is preferably 0.4 nm or more and 15 nm or less. The catalyst is preferably Fe or Co.

As the combination of the catalyst carrier and the catalyst, it is preferred that the catalyst carrier is $Al_2O_3$, and the catalyst is Fe, in terms of the productivity of carbon nanotubes. In addition, in terms of efficiently obtaining carbon nanotubes having a small diameter, it is preferred that the catalyst carrier is $Al_2O_3$, and the catalyst is Co.

The making of the catalyst of the present invention is performed as follows. The catalyst of the present invention can be supported by gasifying the source of the catalyst, and contacting it with the support. The catalyst is fed in a gas state to the reactor. The catalyst can also be fed by feeding the source which is a liquid or a solid at ordinary temperature to the reactor to evaporate the source by the heat of a heated atmosphere in the reactor. The catalyst is supported by contacting the gas source, in which the catalyst source is gasified, with the support. When the support does not have the function of supporting the catalyst, the catalyst carrier is supported on the support, and the catalyst is supported on the supported catalyst carrier.

Further, it is also possible to form catalyst particles or a layer of the catalyst source on the carrier layer on the support particles outside the reactor. For example, when Fe particles are used for the catalyst, it is possible to form the layer of the catalyst source on the carrier layer on the support particles by using an aqueous solution of a salt comprising Fe, such as a nitrate, an acetate, a chloride, or a hydroxide, immersing the support particles in the aqueous solution or applying the aqueous solution to the support particles, and then drying the aqueous solution. By introducing the support particles, on which the catalyst source layer is formed, into the reactor at high temperature, the catalyst source layer can be pyrolyzed to form Fe catalyst particles. In addition, it is also possible to previously pyrolyze the catalyst source layer, using a high-temperature container apart from the reactor, and then introduce the support particles into the reactor. Further, it is also possible to simultaneously support the carrier and the catalyst on the support particles by using a mixed solution of the carrier source and the catalyst source.

When the support has the function of supporting the catalyst, the catalyst is supported directly on the support. In addition, the resupport of a catalyst can also be performed by simultaneously supporting a catalyst carrier and a catalyst. Before the resupport, the support on which the catalyst is supported is preferably subjected to regeneration treatment. The regeneration treatment of the support can be performed regularly or irregularly. The regeneration treatment of the support should be accompanied by oxidation treatment for removing the carbon nanotubes remaining during the separation, and the graphite and the amorphous carbon which are by-products. During the separation of the synthesized carbon nanotubes, much of the catalyst remains on the carrier.

When the synthesis of carbon nanotubes and hydrogen is continued, the nanoparticles of the catalyst may coarsen and lose a catalytic function. In addition, when the nanoparticles of the catalyst coarsen, the properties of the carbon nanotubes synthesized on the catalyst may change. Therefore, the regeneration of the function of the support on which the catalyst is supported is performed by supporting a catalyst carrier on the deactivated catalyst, and further supporting a catalyst. The above oxidation treatment may be a method of flowing a gas comprising oxygen as an element, over the support in a heated state.

When the regeneration treatment of the support is performed and the resupport of a catalyst carrier and a catalyst is performed by the above method, the catalyst carrier and the catalyst are multilayered with sufficient thickness, the activity of the catalyst is maintained or improved, and the separation of the carbon nanotubes from the support becomes also easy. Therefore, by repeatedly performing the synthesis of carbon nanotubes and hydrogen by the method of the present invention, it is possible to produce carbon nanotubes and hydrogen with high productivity.

[Carbon Source and Feed of Carbon Source]

The carbon source contains a carbon atom and a hydrogen atom and is decomposed in a heated state. The carbon source should comprise one or more selected from among alkynes and alkenes (olefin hydrocarbons), alkanes (paraffin hydrocarbons), alcohols, ethers, aldehydes, ketones, aromatic hydrocarbons, pyrolyzable polymers, and petroleum. Among these, the carbon source is preferably a hydrocarbon composed only of a carbon atom and a hydrogen atom, such as, alkynes, alkenes, alkanes, and aromatic hydrocarbons, more preferably acetylene having high reactivity. The carbon source should be fed in a gas state into the reactor. The carbon source can also be fed by feeding a source which is a liquid or a solid at ordinary temperature to the reactor to evaporate the source by the heat of a heated atmosphere in the reactor. The carbon source may be fed as a gas composed only of the carbon source, or may be mixed with a gas, such as a carrier gas, and fed.

By flowing a source gas comprising the carbon source over the support at preferably 0.001 MPa (0.01 atmospheres) to 1.013 MPa (10 atmospheres), the thermal CVD method is performed. Specifically, by feeding a gas comprising the carbon source to the above-described catalyst at 0.001 MPa (0.01 atmospheres) to 1.013 MPa (10 atmospheres), the synthesis of carbon nanotubes and hydrogen is performed. At this time, preferably, a carbon source vapor is mixed with a carrier gas, such as hydrogen, argon, or nitrogen, and fed to the above-described catalyst.

[Product]

The diameter of the synthesized carbon nanotubes should be 0.4 nm or more and 10 nm or less. The diameter of the carbon nanotubes is determined by the type of the catalyst and its size, and is not limited to these values. The length of the carbon nanotubes is determined by synthesis time, and in the case of a use requiring short carbon nanotubes, the synthesis time is made short. In the case of a use requiring long carbon nanotubes, the synthesis time is made long.

The carbon nanotube may be of a single wall, or may be of a plurality of walls. The carbon nanotube should have 1 or more and 10 or less walls. In the method for producing carbon nanotubes and hydrogen according to the present invention, the production of carbon nanotubes having various structures is possible, but the method is a method suitable for the production of SWCNTs. In addition, in the production method of the present invention, the production of carbon nanotubes having various structures is possible by controlling the size and component of the catalyst. In conventional production methods, it is difficult to efficiently produce SWCNTs, but according to the production method of the present invention, the production efficiency of SWCNTs can be dramatically improved.

[Separation and Recovery]

The synthesized carbon nanotubes are layered or remain on the surface or in the vicinity of the catalyst, the catalyst carrier, the support, and the like, and therefore, it is necessary to separate these and recover only the carbon nanotubes, or recover the carbon nanotubes together with the support.

When the separation of the carbon nanotubes is performed in the reactor, the synthesized carbon nanotubes should be separated by an unsteady gas pulse or a steady separation gas flow from places where the synthesized carbon nanotubes are layered or remain on the surface or in the vicinity of the catalyst, the catalyst carrier, the support, and the like. The unsteady gas pulse refers to making a pulsed flow at a constant cycle with the flow velocity of an inert gas, such as argon or nitrogen. The steady gas flow refers to an inert gas flow or a carbon source gas flow in which flow velocity is constant. The carbon nanotubes on the support are separated by the dynamic pressure of the separation gas flow. Kinetic energy that a fluid having density and speed has the dimension of pressure, and this is dynamic pressure. The carbon nanotubes can be recovered by appropriate recovery means from a gas comprising the carbon nanotubes separated by this dynamic pressure. As the recovery means, a filter, a cyclone, or the like can be used. In the case of a filter, the gas comprising the carbon nanotubes separated by this dynamic pressure can be filtered by the filter to collect the carbon nanotubes on the filter.

In the case of a cyclone, the carbon nanotubes can be separated and recovered from the gas comprising the carbon nanotubes separated by this dynamic pressure, by a cyclone type separator, using their difference in inertial force. Further, it is also possible to contact the gas comprising the separated carbon nanotubes with a liquid to collect the carbon nanotubes in the liquid. Further, it is also possible to, by a gas flow, contact the gas comprising the separated carbon nanotubes with a solid wall or a liquid wall at a temperature lower than the temperature of this gas flow to collect the carbon nanotubes by thermal migration.

In addition, when the separation of the carbon nanotubes is performed outside the reactor, the support to which the carbon nanotubes are attached is recovered from the reactor, and the separation of the carbon nanotubes from the support is performed. When the support is one having a structure in a porous form, a fiber form, a tube form, a wire form, a net form, a grid form, a sponge form, a plate form, a layer form, or the like, the support should be removed from the reactor by machine operation. When the support is particles in a powder form, a bead form, or the like, a method of flowing the support upward from the reactor by a gas flow, a method of flowing the support downward from the reactor by gravity, a method of removing the support by mechanical operation, or the like can be adopted. A method for separating the carbon nanotubes from the support removed out of the reactor is not particularly limited.

[Production Process]

The outline of the method for producing carbon nanotubes and hydrogen according to the present invention is as follows. The present invention is characterized in that carbon nanotubes can be produced in a large amount, and simultaneously, hydrogen can also be produced. First, a solid support having a large specific surface area is prepared (a first step). Then, a catalyst carrier is supported on the support (a second step). The support can also serves as a catalyst carrier. In addition to a method of feeding a carrier source vapor to form a layer of a catalyst carrier, for example, it is also possible to directly use the surface of the support as a carrier, and it is also possible that the surface of the support is subjected to oxidation treatment or the like to make an oxide layer, and this also serves as a catalyst carrier.

Then, a catalyst which is nanoparticles is supported on the catalyst carrier (a third step). The catalyst on this support is heated, and while a carbon source, which is a volatile compound, mixed in a carrier gas or the like is fed as a source gas, carbon nanotubes are grown, and simultaneously, hydrogen is synthesized (a fourth step). After the synthesis of the carbon nanotubes and the hydrogen, the carbon nanotubes deposited or remaining on the surface or in the vicinity of the support, the catalyst, the catalyst carrier, and the like are separated by blowing a separation gas, such as an inert gas (a fifth step). This separation gas is blown in the form of a pulse repeated at a constant cycle, or blown at a constant speed. Then, the separated carbon nanotubes are recovered by appropriate recovery means (a sixth step). Further, the hydrogen contained in an emission gas is recovered by appropriate recovery means (a seventh step).

Then, the support with the catalyst which is nanoparticles is regenerated (an eighth step). In other words, in order to repeatedly use the support, the resupport of a catalyst on the support is performed. However, this regeneration of the support may be performed at regular and irregular intervals. In other words, this regeneration of the support is preferably performed as required. This regeneration of the support should be performed when the catalytic function of the catalyst decreases after the synthesis and recovery of carbon nanotubes are repeatedly performed a plurality of times. Then, at the above-described cycle, the catalyst on the support is heated, and while a carbon source is fed, the growth of carbon nanotubes and the synthesis of hydrogen are performed (the fourth step). In this manner, the support with the nanoparticle catalyst is regenerated, and the synthesis of carbon nanotubes and hydrogen is pseudo-continuously performed.

In addition, in the above-described fifth step, the carbon nanotubes deposited or remaining on the surface or in the vicinity of the support, the catalyst, the catalyst carrier, and the like may be recovered, together with the support, outside the reactor (the fifth step). The carbon nanotubes are separated and recovered by appropriate means from the support recovered outside the reactor (the sixth step). Further, the hydrogen contained in an emission gas is recovered by appropriate recovery means (the seventh step).

Then, a support on which a catalyst source or catalyst particles are previously supported is introduced into the reactor in a heated state (the eighth step). In other words, by replacing the catalyst together with the support, the function of the catalyst is regenerated. Then, at the above-described cycle, the catalyst on the support is heated, and while a carbon source is fed, the growth of carbon nanotubes and the synthesis of hydrogen are performed (the fourth step). In this manner, the introduction and recovery of a support with nanoparticle catalyst is repeated, and the synthesis of carbon nanotubes and hydrogen is pseudo-continuously performed. Also in such a production method, by recovering the carbon nanotubes together with the support and feeding a fresh support with temperature remaining constant, good productivity can be obtained. In addition, since the catalyst is fixed on the support, the separation of the carbon nanotubes and the support with the catalyst can be easily performed. In addition, also when the carbon nanotubes are recovered together with the support, the introduction of a support and the simultaneous production of carbon nanotubes and $H_2$ are performed by temporally switching them. In other words, when a catalyst source is fed to attach a catalyst to a support, when a support to which a catalyst source is attached is fed to the reactor, or when a support on which catalyst particles are supported is fed to the reactor, the step of making catalyst particles and the step of synthesizing carbon nanotubes are temporally divided, and therefore, the improvement of the purity of the obtained carbon nanotubes, a high degree of control of the catalyst, and the like are possible.

The above first to eighth steps constitute one preferred embodiment of the production method of the present invention, but, as previously described, the production method of the present invention can also have other embodiments.

The production method comprising the first to eighth steps described above can be positioned as a synthesis method in which the A method and the B method described in Background Art are combined. In other words, the production method comprising the first to eighth steps is a method of pseudo-spreading from a two-dimensional space to a three-dimensional space by making the support catalyst of the B method, using a support having a large specific surface area. Further, the steps of catalyst support, synthesis, and separation are performed by temporally switching them, and repeated. During these switching and repetition, the support is kept in a heated state. Therefore, carbon nanotubes can be produced roughly continuously, strictly speaking, pseudo-continuously.

In the production method comprising the first to eighth steps, using the method of separating the carbon nanotubes by the separation gas in the reactor, described above, the carbon source, and the catalyst source and/or the carbon removal gas flow are fed by switching them depending on time, with the support remaining in a heated state. When the gas flows are switched in this manner, the catalyst can be prevented from being mixed into the product carbon nanotubes. In addition, it is possible to feed both the carbon source and the catalyst source from one feed part. Therefore, the number of feed pipes for gas feed can be decreased, contributing to cost reduction. In the present invention, as shown in Example 1 described later, impurities are controlled to 1% or less.

In Example 1, a carrier layer having an average film thickness of 15 nm and a catalyst having an average film thickness of 1.5 nm are supported, and then, carbon nanotubes having a length of about 0.5 mm are grown. During the separation of the carbon nanotubes, most of the catalyst remains on a support, and impurities other than carbon are controlled to 1% or less.

Embodiments of the present invention will be specifically described below with reference to the drawings. An apparatus for simultaneously producing carbon nanotubes and hydrogen preferred in performing the method for producing carbon nanotubes and hydrogen according to the present invention, comprising the first to eighth steps, using the method of separating the carbon nanotubes by the separation gas in the reactor, described above, will be described below. FIG. 1 is a schematic diagram showing the outline of an apparatus for simultaneously producing carbon nanotubes and hydrogen in an embodiment of the present invention for producing carbon nanotubes and hydrogen. As illustrated in FIG. 1, the apparatus for simultaneously producing carbon nanotubes and hydrogen according to the present invention has a reactor 1, a heater 4, a cyclone 7, and a hydrogen recovery apparatus 10 which are vertically mounted. The reactor 1 is a reactor for synthesizing carbon nanotubes and hydrogen. The upper part of the reactor 1 has a large diameter, and a lower part is partitioned by a porous plate 2. Many pores are provided in the porous plate 2.

A feed pipe 5 for feeding a gas is connected to the lower part of the reactor 1. A gas is fed from the feed pipe 5, passes through the pores of the porous plate 2, and is fed into the reactor 1. As this gas, source gases, such as a carrier source vapor, a catalyst source vapor, and a carbon source, and carrier gases, such as hydrogen, argon, and nitrogen, are fed. But, it is possible to provide another feed pipe in the side part or upper part of the reactor to feed part of the above-described source gases and carrier gases, and the like.

An emission pipe 6 for a gas emitted from the reactor 1 is connected to the upper part of the reactor 1. Support particles 3 are filled and placed in this reactor 1. As shown in FIG. 1, the particles 3 placed in the reactor 1 are shown by dots. The heater 4 is provided so as to cover the outside of the reactor 1. When the heater 4 is driven, this generates heat, and the particles 3 are heated by heat conduction, and heated to a predetermined temperature. As illustrated in FIG. 1, the cyclone 7 is for separating the carbon nanotubes from the gas emitted from the reactor 1. As illustrated in FIG. 1, the hydrogen recovery apparatus 10 is for separating and recovering the hydrogen from the emission gas from which the carbon nanotubes are separated.

Figure 2:
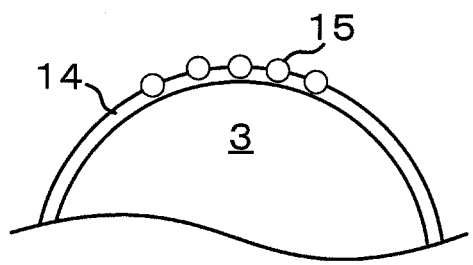
FIG. 2 is a conceptual diagram showing the outline of a catalyst, which is nanoparticles, formed on a support in an embodiment of the present invention.
Figure 2:
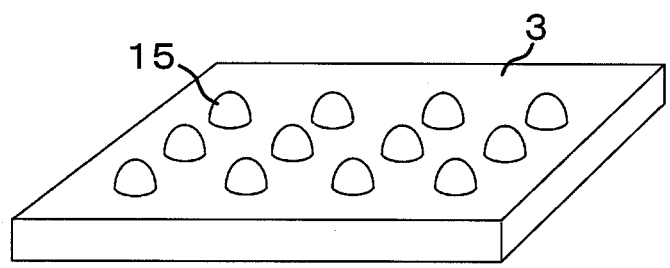

The emission pipe 6 connected to the reactor 1 is connected to the cyclone 7. Thus, the emission gas from the reactor 1 is fed to the cyclone 7. When a carrier source vapor and a catalyst source vapor are flowed in a state in which the particles 3 are heated, a catalyst is formed on the particles 3. A conceptual diagram of the particle 3 with the catalyst is shown in FIG. 2(a). As illustrated in FIG. 2(a), a layered carrier (carrier layer) 14, and spherical catalysts 15 in the form of being partly buried in the carrier 14 are formed on the particle 3. The catalyst 15 is a nanoparticle, and its particle diameter is about 0.4 nm to 15 nm. Since the particle 3 is heated, the carrier 14 and the catalysts 15 formed on the particle 3 are also heated.

When a carbon source is fed to these, carbon nanotubes are synthesized and grow on the catalysts 15. In addition, hydrogen is synthesized simultaneously with the carbon nanotubes being synthesized. A carbon source vapor is fed as a source gas, together with a carrier gas, such as hydrogen, argon, or nitrogen, from below the reactor 1, and the carbon source is fed for a predetermined time, and carbon nanotubes and hydrogen are synthesized. After the synthesis of the carbon nanotubes and the hydrogen, the carbon nanotubes are separated from the particles 3, and recovered. In order to separate the carbon nanotubes from the particles 3, a separation gas is fed from the feed pipe 5 into the reactor 1. The wind velocity of this separation gas should be such strength that the carbon nanotubes are separated from the particles 3, that is, the catalysts 15.

For the feed of the separation gas, the feed of the separation gas and the stopping of the feed are alternately repeatedly performed, that is, the separation gas is fed in a pulse form. Further, since the carbon nanotubes can be separated at a lower wind velocity as they grow longer, it is possible to flow the source gas at a constant flow velocity and separate the carbon nanotubes growing long from the particles. In addition, it is also possible to allow the gas during the carbon nanotube synthesis to have the function of the separation gas. The carbon nanotubes entrained in the separation gas is recovered through the cyclone 7. The carbon nanotubes can be separated and recovered from the gas fed to the cyclone 7, using their difference in inertial force. The separation gas is emitted from the first emission port 8 of the cyclone 7, and the carbon nanotubes are emitted from a second emission port 9.

Further, when the synthesis of carbon nanotubes is performed in a fluidized bed state, rather than a fixed bed state, in the reactor 1, the carbon nanotubes peel off due to friction when the particles 3 collide with each other, and therefore, the carbon nanotubes can be steadily separated during the synthesis, which is preferred. In addition, the carbon nanotubes may be separated regularly or irregularly by passing the separation gas at high speed after the synthesis to intensify a fluidized state. The carbon nanotubes separated and entrained in a gas flow are recovered through the cyclone 7.

The hydrogen synthesized simultaneously with the carbon nanotubes is recovered before the separation and recovery of the carbon nanotubes or after the separation and recovery of the carbon nanotubes. For example, when the source gas during the carbon nanotube synthesis is allowed to have the function of the separation gas, and the separation of the carbon nanotubes is performed while the synthesis of the carbon nanotubes is performed, the carbon nanotubes are entrained in the emission gas comprising the hydrogen, carried to the cyclone 7, and recovered, and then, the emission gas separated from the carbon nanotubes is carried to the hydrogen recovery apparatus 10, and the hydrogen is recovered. On the other hand, when the synthesis of carbon nanotubes and hydrogen by the feed of the source gas, and the separation of the carbon nanotubes by the feed of the separation gas are separately performed, the emission gas, after the source gas is fed and the synthesis is performed, is carried to the hydrogen recovery apparatus 10 in a state containing the hydrogen, and the hydrogen is recovered, and then, by the feed of the separation gas, the carbon nanotubes are entrained in the separation gas, carried to the cyclone 7, and recovered.

Figure 3:
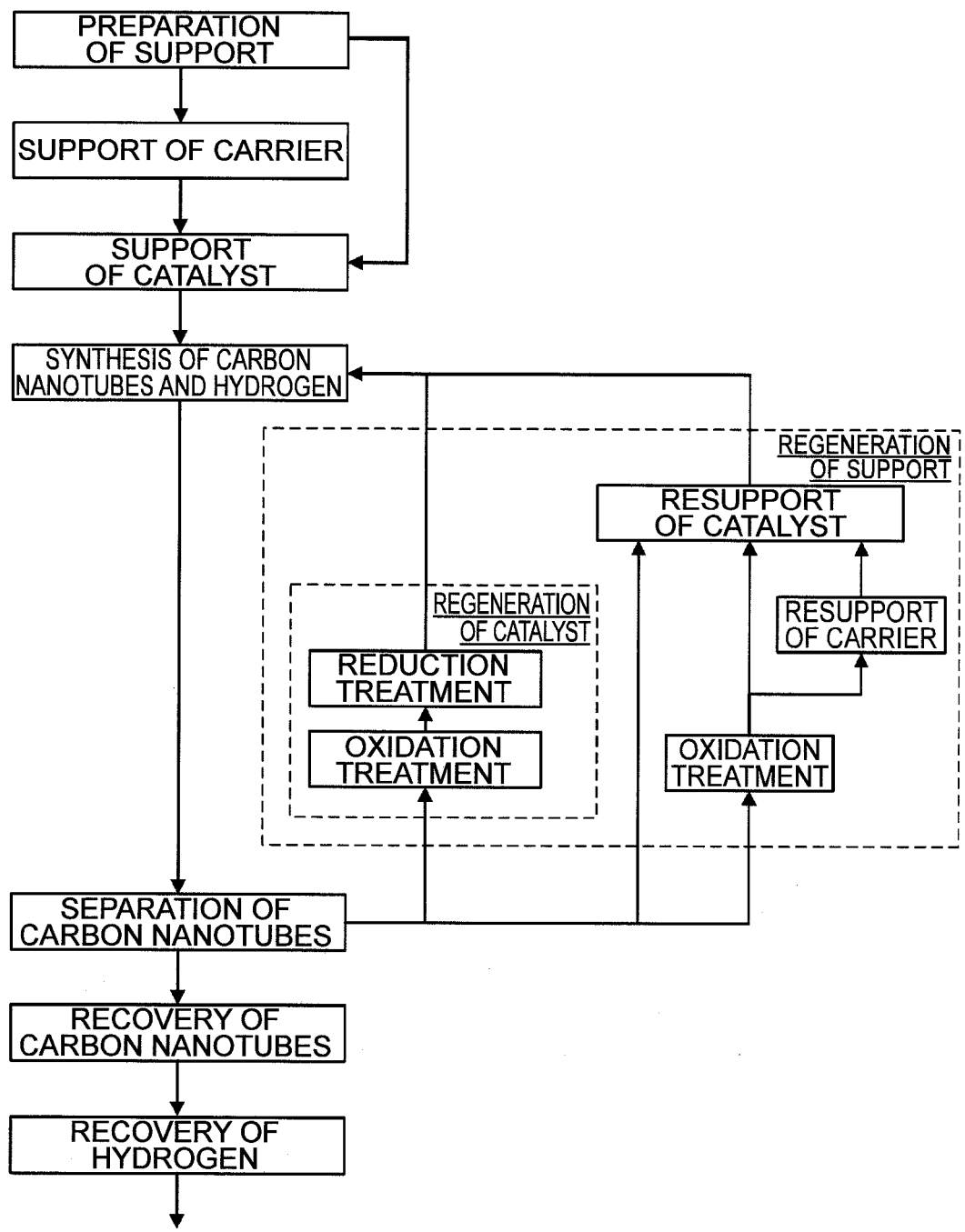
FIG. 3 is a diagram illustrating a process flow when carbon nanotubes and hydrogen are synthesized.

A process flow when carbon nanotubes and hydrogen are synthesized is shown in FIG. 3. As a whole, the process has the steps of the preparation of a support, the support of a carrier, the support of a catalyst, the synthesis of carbon nanotubes and hydrogen, the separation of the carbon nanotubes, the recovery of the carbon nanotubes, the recovery of the hydrogen, and the regeneration of the catalyst. The steps will be described in detail.

There are various modifications depending on what types are used for the support and the catalyst. This embodiment uses particles in a bead form as an example of the support. In the synthesis of carbon nanotubes, the specific surface area of the support is a large element that determines productivity. But, even if the specific surface area is increased by a fine structure on a nanometer scale, only part of the surface can be used because of the diffusion controlling of the gas source, that is, reaction speed is determined by a speed at which the reacting gas source contacts with the support.

In addition, problems of the fine structure on a nanometer scale are that it is clogged with growing carbon nanotubes and quickly loses its function, and the recovery of the carbon nanotubes formed in fine pores is difficult. Further, it is also difficult to flow a gas through the support. Therefore, it is necessary to gain the specific surface area by a structure on substantially the same size scale as a gas boundary film, and simultaneously ensure the flow path of the gas. Conventionally, one substrate has been used for the support. The substrate has a two-dimensional structure, and ensuring a gas flow path is also easy, but only a small part of a three-dimensional space in the reactor can be used. Therefore, by using particles, rather than the substrate, and filling the particles into the reactor, it is possible to increase surface area while ensuring a gas flow path.

For example, when $N^3$ particles having a diameter d are filled, the surface area is $\pi d^2 N^3$ and can be increased up to 4N times, compared with a surface area of $\pi N^2 d^2/4$ when one disk having a diameter Nd is mounted. Also from this viewpoint, the particles in a bead form have an ideal structure. The particles are formed of ceramic having a diameter of about 0.2 mm to 2 mm, and their specific surface area is $(\pi d^2)/(\pi d^3/6) = 6/d$ [$mm^2/mm^3$] when the diameter is d, and with d=0.5 [mm], the specific surface area is 12 [$mm^2/mm^3$]. On the other hand, clearance between the particles is substantially the same as the particle diameter, and therefore, a gas flow path width of 0.03 mm or more and 30 mm or less can be sufficiently ensured.

[Support of Carrier and Catalyst]

After a reactor in which particles as a support are filled is heated, a carrier source vapor is flowed to deposit a carrier so as to cover the support. It is also possible to allow the support to have the function of a carrier, and at the time, it is not always necessary to support a carrier. Next, a catalyst source vapor is flowed to support nanoparticles which are catalysts. It is also possible to simultaneously feed a carrier source vapor and a catalyst source vapor to simultaneously support a carrier and a catalyst.

At this time, the catalyst segregates on the carrier, and again, catalyst nanoparticles form on the carrier. It is also possible to perform the support of the carrier and the catalyst, with the support particles being in a fixed bed state, but when the support of the carrier and the catalyst is performed with the support particles being in a fluidized bed state, the support particles are uniformly mixed, and therefore, the carrier and the catalyst can also be uniformly supported, which is more preferred.

Figure 4:
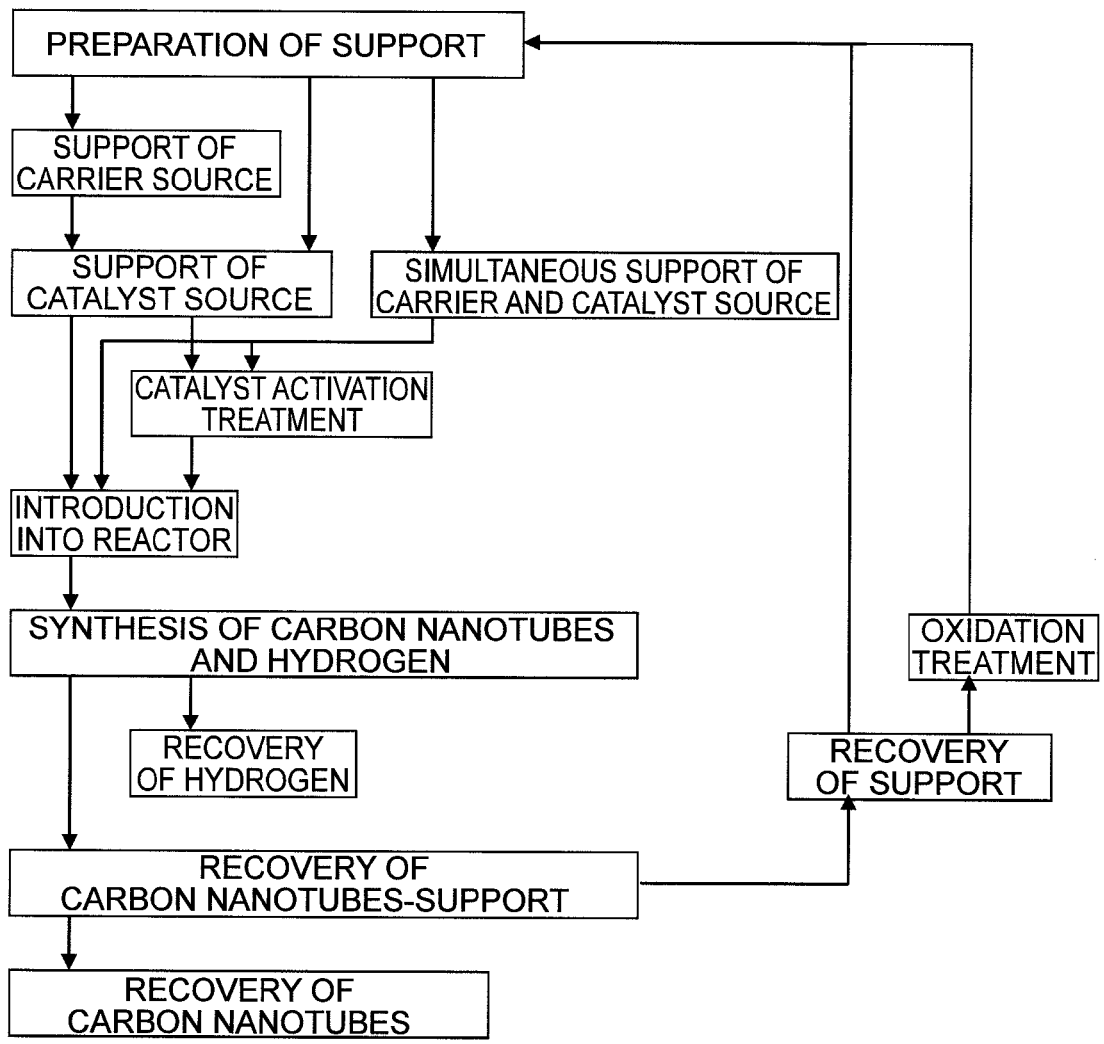
FIG. 4 is a diagram illustrating a process flow when carbon nanotubes and hydrogen are synthesized.

As in FIG. 4, the catalyst may be supported on the support by attaching a carrier source and a catalyst source which are the sources of the catalyst to the support and heat-treating them in the reactor. In addition, it is possible to subject the support, to which the carrier source and the catalyst source are attached, to activation treatment to prepare the support on which the catalyst is supported, and fill this into the reactor. In this case, it is not necessary to perform the catalyst supporting step of supporting the catalyst on the support, in the reactor. As a method for attaching the carrier source and the catalyst source to the support, it is possible to impregnate the support with a solution in which these sources are dissolved and then dry the solution, or it is possible to apply a solution, in which these sources are dissolved, to the support and then dry the solution. In addition, the carrier source and the catalyst source in a gas form may be attached to the support by a physical vapor deposition method, a sputtering method, a CVD method, or the like. Further, it is possible to allow the support to also play the role of a carrier and attach the catalyst source directly to the support or support catalyst particles directly on the support.

[Synthesis of Carbon Nanotubes and Hydrogen on Support]

When a carbon source vapor is flowed over the heated support on which the catalyst is supported, carbon nanotubes can be synthesized on the support, and simultaneously, hydrogen can be synthesized. It is also possible to perform the synthesis of carbon nanotubes and hydrogen, with the support particles being in a fixed bed state, but when the synthesis of carbon nanotubes and hydrogen is performed with the support particles being in a fluidized bed state, the support particles are uniformly mixed, and therefore, the carbon nanotubes can be uniformly synthesized, and the hydrogen can be efficiently synthesized, which is more preferred.

[Separation of Carbon Nanotubes from Support]

The separation of the synthesized carbon nanotubes and the support catalyst is performed by feeding a separation gas. The separation gas may be a gas pulse fed by a method of repeating the feed and stop of a gas inactive in the synthesis at a constant speed for a constant time, that is, a gas pulse fed by changing the gas in a pulse form, or a separation gas fed at a continuous constant flow velocity. In addition, a gas active in carbon nanotube synthesis may be used as the separation gas. Further, when the synthesis of carbon nanotubes is performed in a fluidized bed state, rather than a fixed bed state, the carbon nanotubes peel off due to friction when the particles collide with each other, and therefore, the carbon nanotubes can be steadily separated during the synthesis, which is more preferred. In addition, the carbon nanotubes may be separated regularly or irregularly by passing the separation gas at high speed after the synthesis to intensify a fluidized state.

[Separation of Carbon Nanotubes from Support]

The separation of the synthesized carbon nanotubes and the support catalyst is performed by feeding a separation gas. The separation gas may be a gas pulse fed by a method of repeating the feed and stop of a gas inactive in the synthesis at a constant speed for a constant time, that is, a gas pulse fed by changing the gas in a pulse form, or a separation gas fed at a continuous constant flow velocity. In addition, a gas active in carbon nanotube synthesis may be used as the separation gas. Further, when the synthesis of carbon nanotubes is performed in a fluidized bed state, rather than a fixed bed state, the carbon nanotubes peel off due to friction when the particles collide with each other, and therefore, the carbon nanotubes can be steadily separated during the synthesis, which is more preferred. In addition, the carbon nanotubes may be separated regularly or irregularly by passing the separation gas at high speed after the synthesis to intensify a fluidized state.

The separation of the carbon nanotubes from the support need not always be performed in the reactor, and the separation of the carbon nanotubes from the support may be performed after the support to which the carbon nanotubes are attached is recovered from the reactor. A separation method at this time is not particularly limited. In addition, in this case, the recovery of the carbon nanotubes described below is also performed outside the reactor.

[Recovery of Carbon Nanotubes]

The carbon nanotubes separated and entrained in a gas flow are recovered. Regarding this recovery, various methods are possible. For example, the gas comprising the separated carbon nanotubes can be filtered by a filter to collect the carbon nanotubes on the filter. In addition, the carbon nanotubes can be separated from other gases, using a cyclone.

[Recovery of Hydrogen]

Hydrogen ($H_2$) contained in an emission gas emitted from the reactor after the synthesis is recovered. This hydrogen contained in the emission gas can be separated and recovered by a general hydrogen recovery method. Examples of the hydrogen recovery method include a membrane separation method, a chemical adsorption method, a physical adsorption method, a cryogenic separation method, and an adsorbent method. Among these, the membrane separation method is preferred as the hydrogen recovery method. Examples of a hydrogen separation membrane used in the membrane separation method include membranes containing porous materials, palladium, alloy systems, or the like. In addition, in the process flow of FIG. 3, the recovery of the hydrogen is after the recovery of the carbon nanotubes, but the recovery of the hydrogen may be performed before the separation and recovery of the carbon nanotubes.

[Resupport of Catalyst]

The regeneration of the catalyst deactivated with the synthesis of carbon nanotubes and hydrogen is an element technology important for the mass production, continuous production, and lower price of carbon nanotubes. Examples of causes of the deactivation include, first, the oxidation and carbonization of metal nanoparticles which are catalysts, and these deactivated catalysts can be returned to a highly active metal state by oxidizing the catalysts and then reducing them. However, when the catalysts are used for a longer time, coarsening, in which the number of metal nanoparticles which are catalysts decreases and particle diameter increases, occurs, and it is difficult to make the coarsened metal nanoparticles finer again.

This embodiment enables the repeated use of the support by resupporting a catalyst. For this, first, the synthesized carbon nanotubes are separated from the catalyst. Then, oxidation treatment for removing remaining carbon nanotubes, and graphite and amorphous carbon which are by-products is performed. After the oxidation treatment, a carrier source vapor is flowed to deposit a carrier so as to cover the deactivated coarse catalyst particles. Further, a catalyst source vapor is flowed to resupport active fine catalyst particles on the carrier.

It is also possible to simultaneously feed a carrier source vapor and a catalyst source vapor to simultaneously resupport a carrier and a catalyst. At this time, the catalyst segregates on the carrier, and again, catalyst particles form on the carrier. It is also possible to perform the resupport of a carrier and a catalyst, with the support particles being in a fixed bed state, but when the resupport of a carrier and a catalyst is performed with the support particles being in a fluidized bed state, the support particles are uniformly mixed, and therefore, the carrier and the catalyst can also be uniformly resupported, which is more preferred. As shown in FIG. 3, the oxidation treatment, and the resupport of a carrier can be performed as required.

In addition, when the support to which the carbon nanotubes are attached is recovered from the reactor, a support is newly introduced into the reactor, and the support of a catalyst is performed. At this time, as in FIG. 4, it is possible to introduce a support on which a catalyst is previously supported, and further, it is possible to support a catalyst source or a catalyst on the support from which the carbon nanotubes are separated, and then introduce it into the reactor again.

[Regarding Repeated Operation]

By flowing a carbon source vapor over the support on which the resupport of a catalyst is completed, the synthesis of carbon nanotubes and hydrogen can be resumed. Making time occupied by the synthesis of carbon nanotubes and hydrogen long with respect to the cycle of the repeated operation of the synthesis of carbon nanotubes and hydrogen, the separation and recovery of the carbon nanotubes, the recovery of the hydrogen, the oxidation treatment of the support, and the resupport of a carrier and a catalyst holds a key to carbon nanotube productivity improvement. When the synthesis of carbon nanotubes and hydrogen is performed with the support particles in a fixed bed state, the carbon source vapor does not reach the catalyst on the support as the carbon nanotubes grow longer, and the productivity of carbon nanotubes and hydrogen decreases.

At this time, it is necessary to perform the separation of the carbon nanotubes from the support early. On the other hand, when the synthesis of carbon nanotubes and hydrogen is performed with the support particles in a fluidized bed state, the carbon nanotubes peel off the support particles due to friction in collision between the support particles. Therefore, the feed of the carbon source vapor to the catalyst particles on the support particles is good, and the synthesis of carbon nanotubes and hydrogen can be continued until the catalyst is deactivated, which is more preferred. Although depending on operation and synthesis conditions and the like, the oxidation treatment, and the resupport of a carrier and a catalyst are possible in 1 second or more and 10 minutes or less.

On the other hand, the synthesis of carbon nanotubes and hydrogen preferably continues for 10 seconds or more and 10 hours or less. Therefore, the cycle of the repeated operation is preferably 10 seconds or more and 10 hours or less, and it is preferred to use a time of 10% or more and 99.99% or less of the cycle for the synthesis of carbon nanotubes and hydrogen. The time proportion of the cycle of the repeated operation and the synthesis of carbon nanotubes and hydrogen is not limited to the above.

Figure 5:
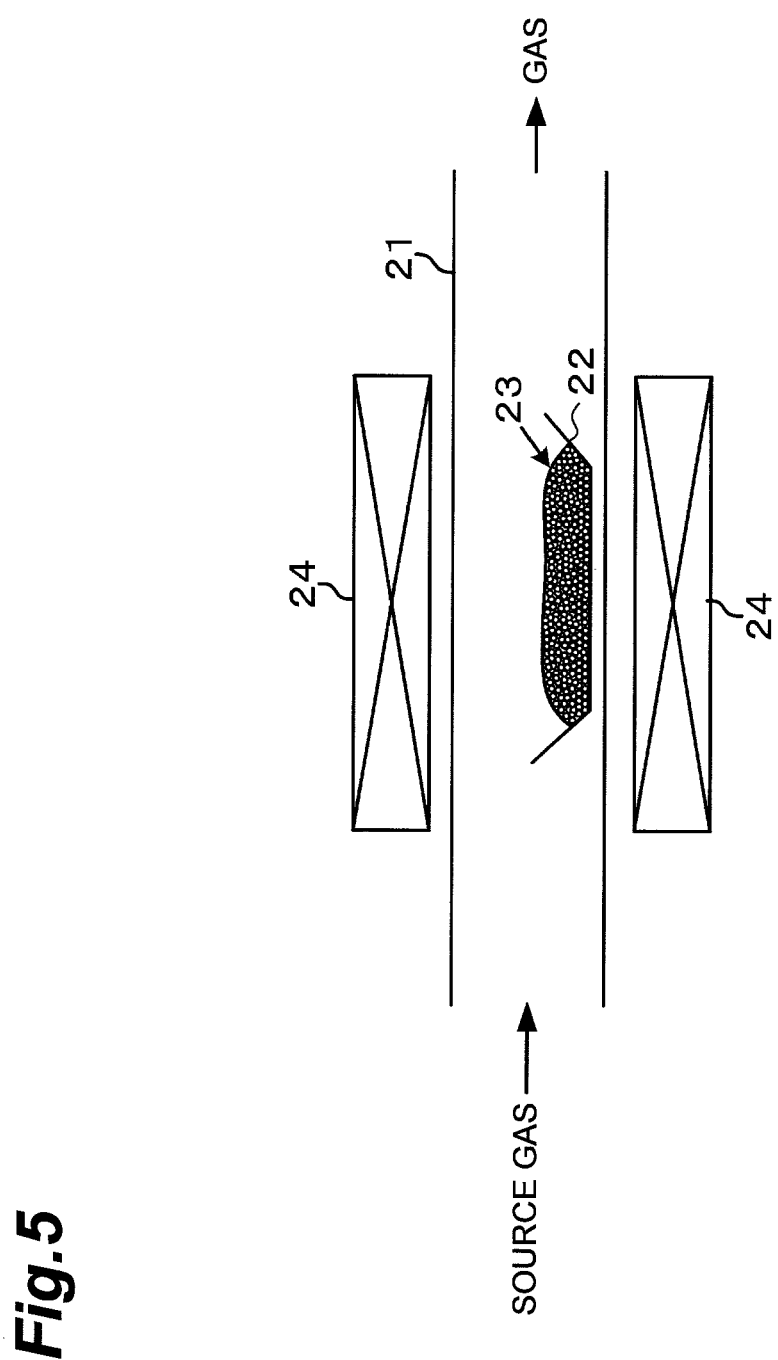
FIG. 5 is a schematic diagram showing another example of the apparatus for simultaneously producing carbon nanotubes and hydrogen in the embodiment of the present invention.

FIG. 5 is a schematic diagram of another example of the apparatus for simultaneously producing carbon nanotubes and hydrogen according to the present invention for producing carbon nanotubes and hydrogen. FIG. 5 is the outline of the apparatus for simultaneously producing carbon nanotubes and hydrogen according to the present invention in the case of fixed-bed CVD. A reactor 21 has a horizontal cylinder as in the above. Support particles 23 are loaded on a board 22, and placed in the reactor 21. Other operations are similar to the apparatus for simultaneously producing carbon nanotubes and hydrogen according to the present invention described above, and their description is omitted. In addition, catalysts 15 when the support is a fixed substrate 3 are shown in FIG. 2(b).

EXAMPLES

Next, the embodiment of the present invention will be described in detail by Examples.

Example 1

Example 1 of the present invention will be described. Here, alumina beads were used as a support, and an $Al_2O_3$ carrier was supported on the alumina beads. The $Al_2O_3$ carrier was sputtered on the alumina beads. The alumina beads had a diameter of 0.5 mm. The average film thickness of the $Al_2O_3$ carrier (carrier layer) was 15 nm. Then, Fe was supported on the $Al_2O_3$ carrier as a catalyst. This support was performed by sputtering-support. The Fe supported on the $Al_2O_3$ carrier had an average film thickness of 1.5 nm. This support was placed in a reactor, and while a source gas at atmospheric pressure with a 1.1 vol % $C_2H_2$/26 vol % $H_2$/0.06 vol % $H_2O$/Ar balance was fed to the reactor, carbon nanotubes and hydrogen were synthesized in a fluidized bed state.

Figure 6:
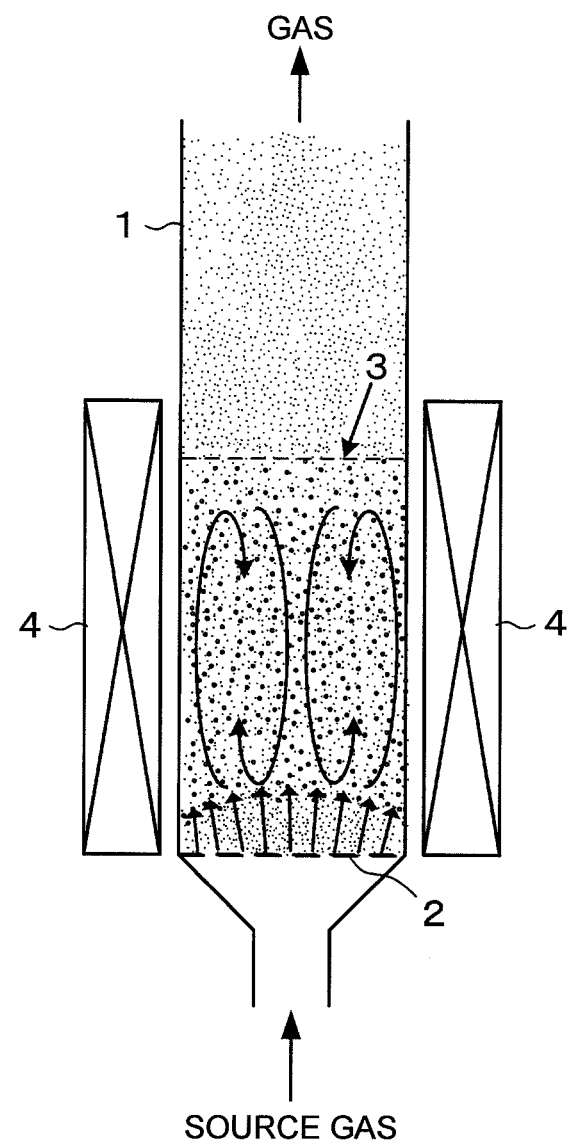
FIG. 6 is a conceptual diagram of a vertical CVD apparatus used in Example 1 of the present invention.
Figure 7:
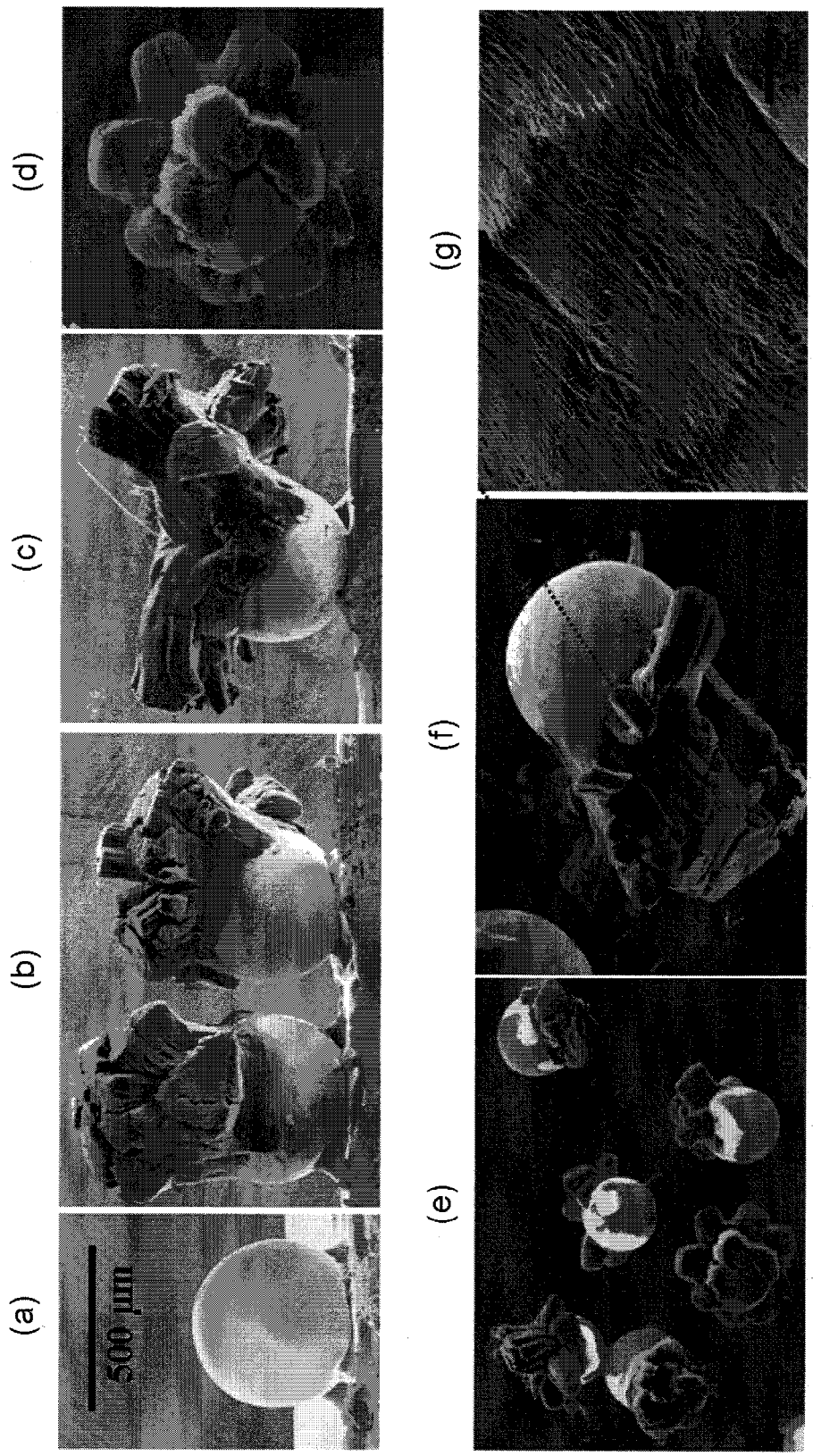
FIG. 7(a) to 7(g) are scanning electron micrographs of alumina beads, to which carbon nanotubes are attached, in Example 1.
Figure 8:
FIG. 8 is a transmission electron microscope image of carbon nanotubes synthesized in Example 1.
Figure 9:
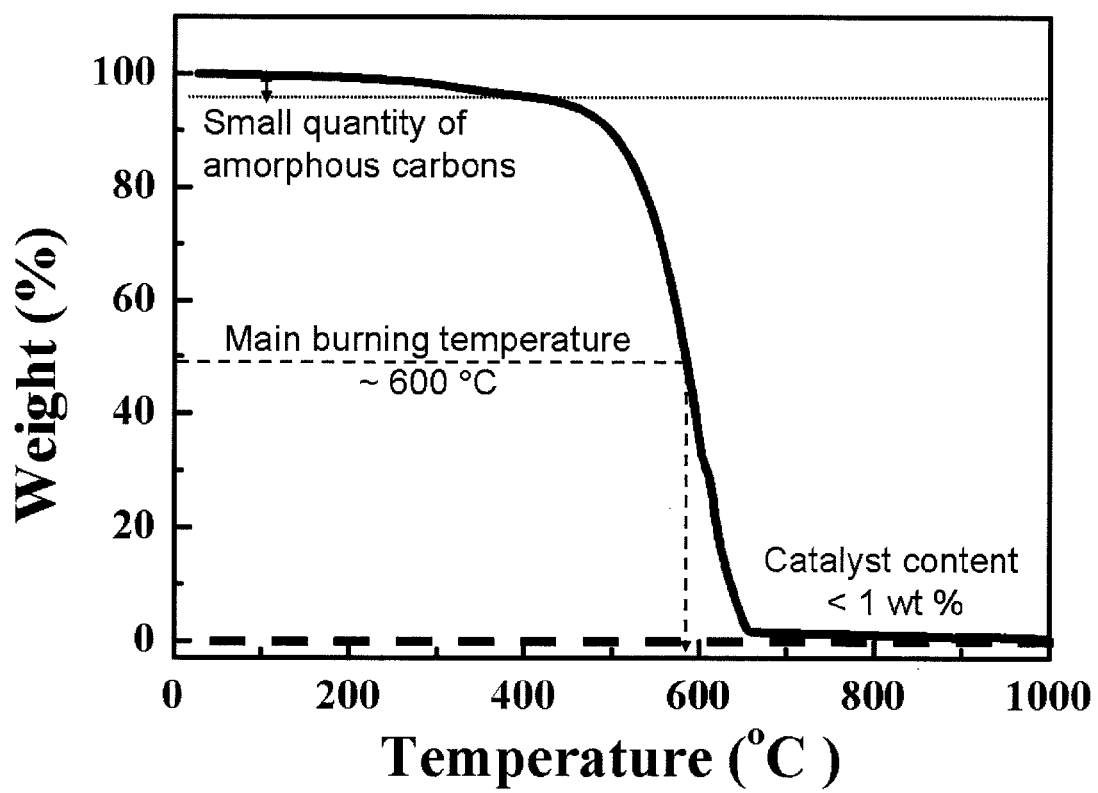
FIG. 9 is a thermogravimetric measurement result of single-walled carbon nanotubes synthesized in Example 1.

The reactor is made of quartz glass shown in FIG. 6, and is a vertical CVD reactor which can be used either as a fixed bed or as a fluidized bed. The temperature of a reaction portion in the reactor was 820° C. The feed of the source gas at atmospheric pressure was performed in a feed amount of 6.7 $m^3$/s (equivalent to 1.8 $m^3$/s at room temperature) per $m^3$ of the reactor volume for 10 minutes to synthesize carbon nanotubes and hydrogen. After the carbon nanotubes and the hydrogen were synthesized, the alumina beads to which the carbon nanotubes were attached were removed from the reactor, and the carbon nanotubes were recovered. FIGS. 7(a) to 7(g) are scanning electron micrographs of the alumina beads to which the carbon nanotubes were attached. In this Example, the sputtering method was used for the support of the catalyst, and therefore, the catalyst was supported only on half the surface of the alumina beads. Therefore, the carbon nanotubes grew only on half the surface of the alumina beads. As a result of performing the synthesis of carbon nanotubes in a fluidized bed by this Example, the synthesized carbon nanotubes were synthesized with a height of up to 0.5 mm. During a synthesis time of 10 minutes, 13 kg of $C_2H_2$ per $m^3$ of the reactor volume was fed, and 8.0 kg of carbon nanotubes per $m^3$ of the reactor volume were synthesized. 12 kg of carbon atoms and 1 kg of hydrogen atoms were contained in the fed 13 kg of $C_2H_2$, and 65% of them were converted into carbon nanotubes and $H_2$. FIG. 8 is a transmission electron microscope image of the synthesized carbon nanotubes. Single-walled carbon nanotubes having a diameter of around 3 nm were synthesized. FIG. 9 is a thermogravimetric measurement result of the single-walled carbon nanotubes. Air was used for an atmosphere gas. Weight decrease at 400° C. or less was due to the burning of amorphous carbon, and the mixing of the amorphous carbon was 5 wt % or less. Weight decrease around 600° C. was due to the burning of the single-walled carbon nanotubes, and weight remaining at 700° C. or more was due to the mixing of the catalyst. The mixing of the catalyst was 1 wt % or less.

Example 2

Example 2 of the present invention will be described. Here, alumina beads were used as a support. The alumina beads had a diameter of 0.5 mm. The alumina beads were impregnated with an aluminum nitrate aqueous solution, and then dried and fired to support an $Al_2O_3$ carrier on the alumina beads. The alumina beads on which the $Al_2O_3$ carrier was supported were impregnated with a ferric nitrate aqueous solution, and then dried and fired to support Fe particles on the $Al_2O_3$ carrier on the alumina beads. This support was placed in a reactor, and while a source gas at atmospheric pressure with a 1.1 vol % $C_2H_2$/26 vol % $H_2$/0.06 vol % $H_2O$/Ar balance was fed to the reactor, carbon nanotubes and hydrogen were synthesized in a fluidized bed state.

Figure 10:
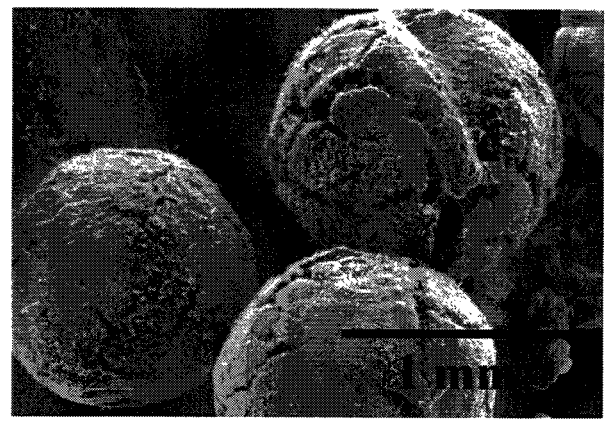
FIG. 10(a) to 10(c) are scanning electron micrographs of alumina beads, to which carbon nanotubes are attached, in Example 2.
Figure 10:
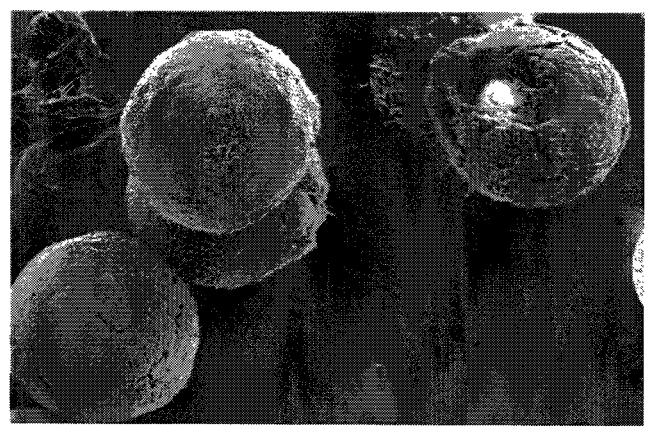
Figure 10:
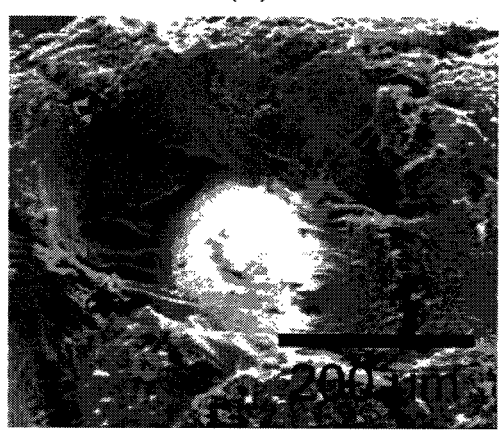

The reactor is made of quartz glass shown in FIG. 6, and is a vertical CVD reactor which can be used either as a fixed bed or as a fluidized bed. The temperature of a reaction portion in the reactor was 820° C. The feed of the source gas at atmospheric pressure was performed in a feed amount of 6.7 $m^3$/s (equivalent to 1.8 $m^3$/s at room temperature) per $m^3$ of the reactor volume for 10 minutes to synthesize carbon nanotubes and hydrogen. After the carbon nanotubes and the hydrogen were synthesized, the alumina beads to which the carbon nanotubes were attached were removed from the reactor, and the carbon nanotubes were recovered. FIGS. 10(*a*) to 10(*c*) are scanning electron micrographs of the alumina beads to which the carbon nanotubes were attached. In this Example, the solution impregnation method was used for the support of the catalyst, and therefore, the catalyst was supported on the entire surface of the alumina beads. Therefore, the carbon nanotubes grew on the entire surface of the alumina beads. As a result of performing the synthesis of carbon nanotubes in a fluidized bed by this Example, the synthesized carbon nanotubes were synthesized with a height of up to 0.2 mm.

Example 3

Example 3 of the present invention will be described. Here, alumina beads were used as a support. The alumina beads had a diameter of 0.5 mm. A reactor is one made of quartz glass shown in FIG. 6, and is a vertical CVD reactor which can be used either as a fixed bed or as a fluidized bed. The alumina beads were introduced into the reactor, and then, the reactor was heated to 820° C. and held. An aluminum isopropoxide vapor with Ar as a carrier gas was introduced into the reactor for 3 minutes to support an $Al_2O_3$ carrier layer on the alumina beads. Next, a ferrocene vapor with Ar as a carrier gas was introduced into the reactor for 1 minute to support Fe catalyst particles on the $Al_2O_3$ carrier layer.

Figure 11:
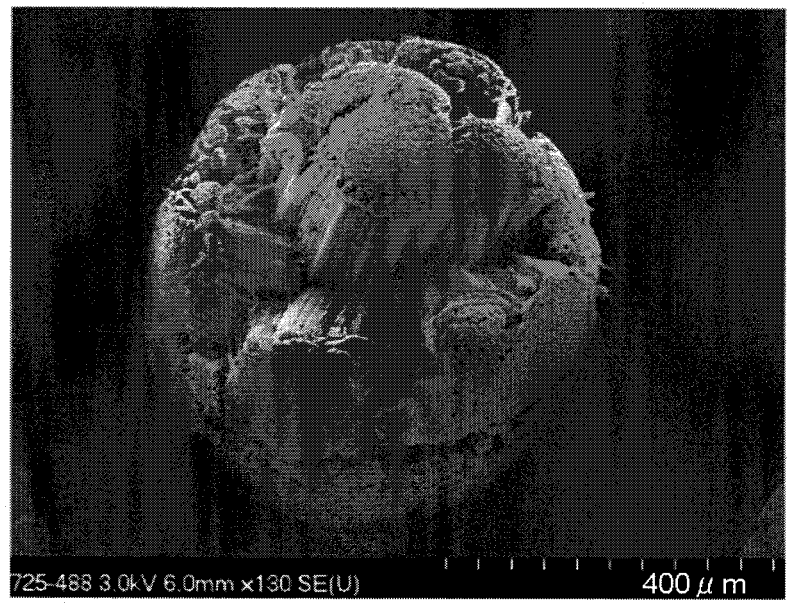
FIG. 11(a) to 11(b) are scanning electron micrographs of alumina beads, to which carbon nanotubes are attached, in Example 3.
Figure 11:
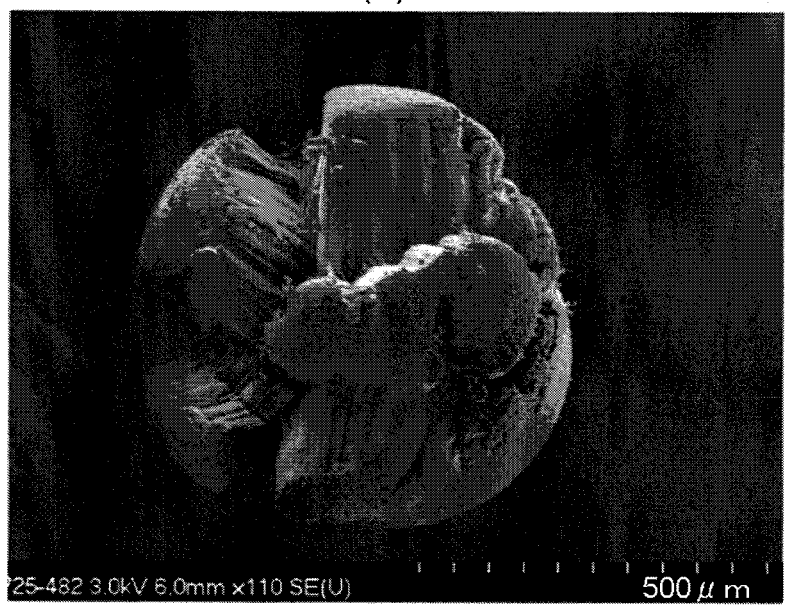

Next, a source gas was fed onto the alumina beads on which the catalyst was supported, held in the reactor at high temperature, to perform the simultaneous synthesis of carbon nanotubes and hydrogen. The feed of the source gas at atmospheric pressure was performed in a feed amount of 6.7 $m^3$/s (equivalent to 1.8 $m^3$/s at room temperature) per $m^3$ of the reactor volume for 10 minutes to synthesize carbon nanotubes and hydrogen. After the carbon nanotubes and the hydrogen were synthesized, the alumina beads to which the carbon nanotubes were attached were removed from the reactor, and the carbon nanotubes were recovered. FIGS. 11(*a*) to 11(*b*) are scanning electron micrographs of the alumina beads to which the carbon nanotubes were attached. In this Example, the CVD method was used for the support of the catalyst, and therefore, the catalyst was supported on the entire surface of the alumina beads. Therefore, the carbon nanotubes grew on the entire surface of the alumina beads. As a result of performing the synthesis of carbon nanotubes in a fluidized bed by this Example, the synthesized carbon nanotubes were synthesized with a height of up to 0.2 mm.

Example 4

Example 4 of the present invention will be described. Here, alumina beads were used as a support. The alumina beads had a diameter of 0.5 mm. A reactor is made of quartz glass shown in FIG. 6, and is a vertical CVD reactor which can be used either as a fixed bed or as a fluidized bed. The alumina beads were introduced into the reactor, and then, the reactor was heated to 820° C. and held. An aluminum isopropoxide vapor with Ar as a carrier gas was introduced into the reactor for 1 minute to support an $Al_2O_3$ carrier layer on the alumina beads. Next, a ferrocene vapor with Ar as a carrier gas was introduced into the reactor for 1 minute to support Fe catalyst particles on the $Al_2O_3$ carrier layer.

Next, a source gas was fed onto the alumina beads on which the catalyst was supported, held in the reactor at high temperature, to perform the simultaneous synthesis of carbon nanotubes and hydrogen. The feed of the source gas at atmospheric pressure was performed in a feed amount of 6.7 $m^3$/s (equivalent to 1.8 $m^3$/s at room temperature) per $m^3$ of the reactor volume for 10 minutes to synthesize carbon nanotubes and hydrogen. After the carbon nanotubes and the hydrogen were synthesized, a separation gas was introduced to separate the carbon nanotubes from the alumina beads, and further, the carbon nanotubes were separated and recovered from an emission gas.

Next, an Ar gas comprising oxygen, as an oxidizing gas, was introduced into the reactor for 10 minutes to oxidize and remove carbon remaining on the alumina beads from which the carbon nanotubes were separated. Next, an aluminum isopropoxide vapor with Ar as a carrier gas was introduced into the reactor for 1 minute to resupport an $Al_2O_3$ carrier on the alumina beads, and further, a ferrocene vapor with Ar as a carrier gas was introduced into the reactor for 1 minute to resupport Fe catalyst particles on the $Al_2O_3$ carrier. After this, the synthesis of carbon nanotubes and hydrogen, the separation and recovery of the carbon nanotubes from the support, the removal of residual carbon on the support, and the resupport of a carrier and a catalyst on the support were performed by similar operation while the reactor was kept in a heated state at 820° C.

Figure 12:
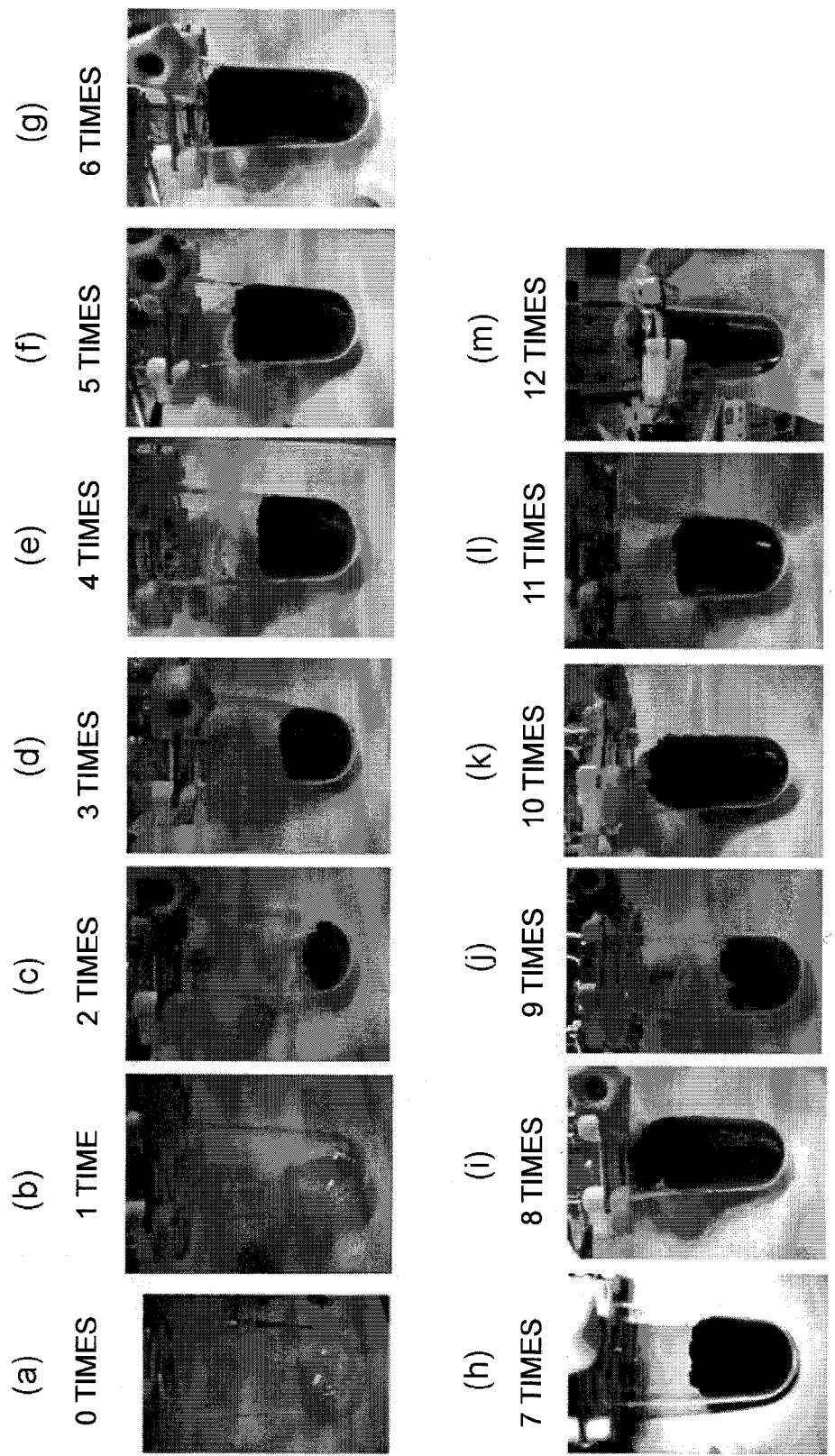
FIG. 12(a) to 12(m) are photographs of carbon nanotubes recovered in Example 4.
Figure 13:
FIG. 13 is a transmission electron microscope image of carbon nanotubes synthesized in Example 4.
Figure 14:
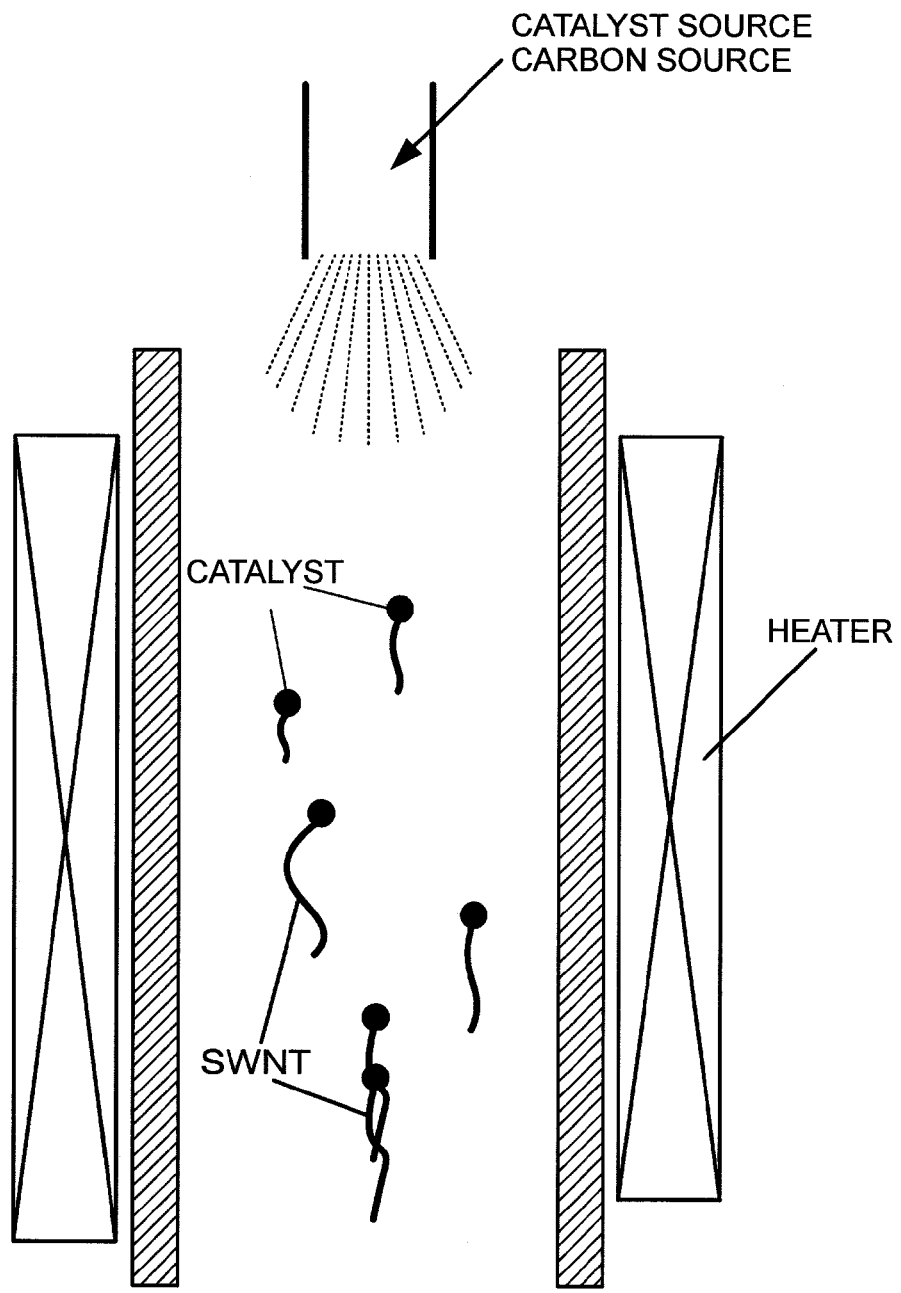
FIG. 14 is a diagram showing the outline of producing carbon nanotubes using a nanoparticle catalyst in a gas phase-dispersed state (an A method) (conventional art).
Figure 15:
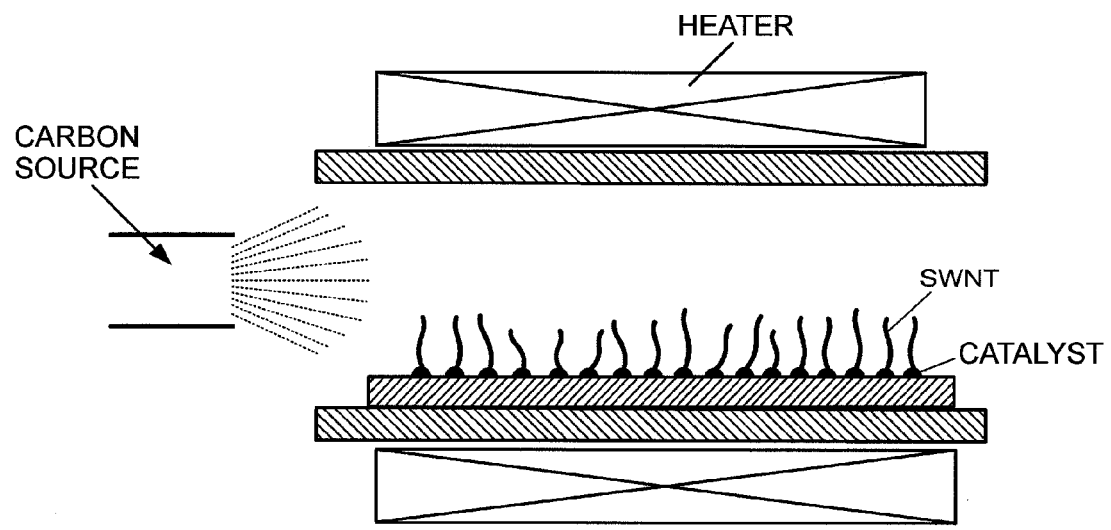
FIG. 15 is a diagram showing the outline of producing carbon nanotubes using a nanoparticle catalyst in a substrate-supported state (a B method) (conventional art).

FIGS. 12(*a*) to 12(*m*) are photographs of the recovered carbon nanotubes. As the number of repetitions increases, the amount of carbon nanotubes increases, and a recovery apparatus became full of carbon nanotubes after 6 times (FIG. 12(*g*)). When the carbon nanotubes were removed from the recovery apparatus, and pseudo-continuous synthesis was continued, next, the recovery apparatus became full after 2 times (an 8-th time) (FIG. 12(*i*)). After this, the recovery apparatus became full after each two repeated operations (FIGS. 12(*k*) and 12(*m*)). In one repeated operation, 8.7 kg of carbon nanotubes per $m^3$ of the reactor volume were synthesized. 12 kg of carbon atoms and 1 kg of hydrogen atoms were contained in 13 kg of $C_2H_2$ fed per $m^3$ of the reactor volume, and 70% of them were converted into carbon nanotubes and $H_2$. FIG. 13 is a transmission electron microscope image of the synthesized carbon nanotubes. Carbon nanotubes having a diameter of about 5 to 10 nm, including single-walled carbon nanotubes, were synthesized.

Industrial Applicability

In the method for producing carbon nanotubes and hydrogen according to the present invention, the mass production of carbon nanotubes is possible, and their production cost can also be largely lowered. Therefore, in the uses of carbon nanotubes produced in the present invention, applications to transparent electrodes, semiconductor thin film, the electrode materials of lithium ion batteries, the electrode materials of fuel cells, the electrode materials of electric double layer capacitors, filler materials for composite polymers, electron emission guns, field emission displays, microscope probes, gas occlusion materials, and the like receive attention. Particularly, in the uses of single-walled carbon nanotubes produced in the present invention, applications to transparent electrodes, the electrode materials of lithium ion batteries, the electrode materials of electric double layer capacitors, and the like receive attention. Further, with the method for producing carbon nanotubes and hydrogen according to the present invention, hydrogen can be simultaneously produced, and therefore, its production cost can also be largely lowered. In other words, hydrogen can be produced in the process of producing carbon nanotubes, and therefore, substantially no production cost is required, and it is possible to obtain hydrogen only at recovery cost.

REFERENCE SIGNS LIST 1, 21 ... reactor, 2 ... porous plate, 3 ... support (particle, fixed substrate), 4, 24 ... heater, 7 ... cyclone, 10 ... hydrogen recovery apparatus, 14 ... carrier, 15 ... catalyst, 22 ... boat.

The invention claimed is:

1. A method for simultaneously producing carbon nanotubes and hydrogen, in which using a carbon source containing carbon atoms and hydrogen atoms and being decomposed in a heated state, and a catalyst for producing carbon nonatubes and $H_2$ from the carbon source, the carbon nanotubes are synthesized on a support in a heated state, placed in a reactor, and simultaneously, the $H_2$ is synthesized from the carbon source, the method comprising:
 a synthesis step of flowing a source gas containing the carbon source over the support, on which the catalyst is supported, to synthesize the carbon nanotubes on the support and simultaneously synthesize the $H_2$ in a gas flow, wherein a feed amount of the source gas in the synthesis step is 0.01 to 100 $m^3$/s per $m^3$ of a reactor volume
 a separation step of flowing a separation gas over the support, on which the carbon nanotubes are synthesized, to separate the carbon nanotubes from the support into the separation gas;
 a removal step of flowing an oxidizing gas over the support after the carbon nanotubes are separated, to oxidize and remove carbon remaining on the support;
 a catalyst resupport step of flowing a source gas of the catalyst over the support after the removal step; and
 a catalyst carrier resupport step of a catalyst carrier of flowing a source gas of the catalyst carrier over the support after the removal step and prior to the catalyst resupport step,
 wherein the steps in the method for simultaneously producing carbon nanotubes and hydrogen are repeatedly performed by switching the gases fed to the reactor, with the support kept in the heated state.

2. The method for simultaneously producing carbon nanotubes and hydrogen according to claim 1, wherein the support is a structure having one shape selected from the group consisting of a powder form, a bead form, a honeycomb form, a porous form, a fiber form, a tube form, a wire form, a net form, a grid form, a sponge form, a plate form, and a layer form.

3. The method for simultaneously producing carbon nanotubes and hydrogen according to claim 2, wherein the support is in a powder form or a bead form, and the synthesis step is performed in a fluidized bed state.

4. The method for simultaneously producing carbon nanotubes and hydrogen according to claim 1, wherein the catalyst comprises a carrier layer and catalyst particles.

5. The method for simultaneously producing carbon nanotubes and hydrogen according to claim 4, wherein the catalyst particles comprise at least one element selected from the group consisting of V, Cr, Mn, Fe, Co, Ni, Cu, Zn, Mo, W, and Au.

6. The method for simultaneously producing carbon nanotubes and hydrogen according to claim 4, wherein the carrier layer comprises at least one element selected from the group consisting of Si, Al, Mg, Zr, Ti, O, N, C, Mo, Ta, and W.

7. The method for simultaneously producing carbon nanotubes and hydrogen according to claim 1, wherein a source of the support comprises at least one element selected from the group consisting of Si, Al, Mg, Zr, Ti, O, N, C, Mo, Ta, and W.

8. The method for simultaneously producing carbon nanotubes and hydrogen according to claim 4, wherein the support also plays a role of the carrier layer and supports directly the catalyst particles thereon.

9. The method for simultaneously producing carbon nanotubes and hydrogen according to claim 1, further comprising a catalyst supporting step of flowing a catalyst source, which is a source of the catalyst, over the support in the heated state to support the catalyst on the support, before the synthesis step.

10. The method for simultaneously producing carbon nanotubes and hydrogen according to claim 1, further comprising:
 a carbon nanotube recovery step of recovering the carbon nanotubes from an emission gas emitted from the reactor; and
 a hydrogen recovery step of recovering the $H_2$ from the emission gas.

11. The method for simultaneously producing carbon nanotubes and hydrogen according to claim 1, further comprising a catalyst supporting step of attaching a catalyst source, which is a source of the catalyst, to the support, introducing the support, to which the source of the catalyst, is attached, into the reactor, and heat-treating the support, to which the source of the catalyst, is attached, in the reactor to support the catalyst on the support, before the synthesis step.

12. The method for simultaneously producing carbon nanotubes and hydrogen according to claim 1, further comprising an introduction step of introducing the support, on which the catalyst is supported, into the reactor, before the synthesis step.

13. The method for simultaneously producing carbon nanotubes and hydrogen according to claim 11, further comprising
 a support recovery step of recovering the support, on which the carbon nanotubes are synthesized, from the reactor, after the synthesis step, wherein
 the steps in the method for simultaneously producing carbon nanotubes and hydrogen are repeatedly performed.

14. The method for simultaneously producing carbon nanotubes and hydrogen according to claim 13, further comprising:
 a carbon nanotube recovery step of separating and recovering the carbon nanotubes from the support on which the carbon nanotubes are synthesized; and
 a hydrogen recovery step of recovering the $H_2$ from an emission gas emitted from the reactor.

15. The method for simultaneously producing carbon nanotubes and hydrogen according to claim 11, further comprising:
 a separation step of flowing a separation gas over the support, on which the carbon nanotubes are synthesized, to separate the carbon nanotubes from the support into the separation gas; and a support recovery step of recovering the support after the carbon nanotubes are separated, from the reactor, wherein the steps in the method for simultaneously producing carbon nanotubes and hydrogen are repeatedly performed.

16. The method for simultaneously producing carbon nanotubes and hydrogen according to claim 15, further comprising:

a carbon nanotube recovery step of recovering the carbon nanotubes from an emission gas emitted from the reactor; and a hydrogen recovery step of recovering the $H_2$ from the emission gas.

17. A method for simultaneously producing carbon nanotubes and hydrogen, in which using a carbon source containing carbon atoms and hydrogen atoms and being decomposed in a heated state, and a catalyst for producing carbon nanotubes and $H_2$ from the carbon source, the carbon nanotubes are synthesized on a support in a heated state, placed in a reactor, and simultaneously, the $H_2$ is synthesized from the carbon source, the method comprising:

a synthesis step of flowing a source gas containing the carbon source over the support, on which the catalyst is supported, to synthesize the carbon nanotubes on the support and simultaneously synthesize the $H_2$ in a gas flow;

a separation step of flowing a separation gas over the support, on which the carbon nanotubes are synthesized, to separate the carbon nanotubes from the support into the separation gas;

a removal step of flowing an oxidizing gas over the support after the carbon nanotubes are separated, to oxidize and remove carbon remaining on the support;

a catalyst resupport step of flowing a source gas of the catalyst over the support after the removal step, wherein the support has a gas flow path having a width of 0.03 mm or more and 30 mm or less within or around the support; and a catalyst carrier resupport step of flowing a source gas of the catalyst carrier over the support after the removal step and prior to the catalyst resupport step, wherein the steps in the method for simultaneously producing carbon nanotubes and hydrogen are repeatedly performed by switching the gases fed to the reactor, with the support kept in the heated state.

18. The method for simultaneously producing carbon nanotubes and hydrogen according to claim 17, wherein the support is a structure having one shape selected from the group consisting of a powder form, a bead form, a honeycomb form, a porous form, a fiber form, a tube form, a wire form, a net form, a grid form, a sponge form, a plate form, and a layer form.

19. The method for simultaneously producing carbon nanotubes and hydrogen according to claim 18, wherein the support is in a powder form or a bead form, and the synthesis step is performed in a fluidized bed state.

20. The method for simultaneously producing carbon nanotubes and hydrogen according to claim 17, wherein the catalyst comprises a carrier layer and catalyst particles.

21. The method for simultaneously producing carbon nanotubes and hydrogen according to claim 20, wherein the catalyst particles comprise at least one element selected from the group consisting of V, Cr, Mn, Fe, Co, Ni, Cu, Zn, Mo, W, and Au.

22. The method for simultaneously producing carbon nanotubes and hydrogen according to claim 20, wherein the carrier layer comprises at least one element selected from the group consisting of Si, Al, Mg, Zr, Ti, O, N, C, Mo, Ta, and W.

23. The method for simultaneously producing carbon nanotubes and hydrogen according to claim 17, wherein a source of the support comprises at least one element selected from the group consisting of Si, Al, Mg, Zr, Ti, O, N, C, Mo, Ta, and W.

24. The method for simultaneously producing carbon nanotubes and hydrogen according to claim 20, wherein the support also plays a role of the carrier layer and supports directly the catalyst particles thereon.

25. The method for simultaneously producing carbon nanotubes and hydrogen according to claim 17, further comprising a catalyst supporting step of flowing a catalyst source, which is a source of the catalyst, over the support in the heated state to support the catalyst on the support, before the synthesis step.

26. The method for simultaneously producing carbon nanotubes and hydrogen according to claim 17, further comprising:

a carbon nanotube recovery step of recovering the carbon nanotubes from an emission gas emitted from the reactor; and a hydrogen recovery step of recovering the $H_2$ from the emission gas.

27. The method for simultaneously producing carbon nanotubes and hydrogen according to claim 17, further comprising a catalyst supporting step of attaching a catalyst source, which is a source of the catalyst, to the support, introducing the support, to which the source of the catalyst, is attached, into the reactor, and heat-treating the support, to which the source of the catalyst, is attached, in the reactor to support the catalyst on the support, before the synthesis step.

28. The method for simultaneously producing carbon nanotubes and hydrogen according to claim 17, further comprising an introduction step of introducing the support, on which the catalyst is supported, into the reactor, before the synthesis step.

29. The method for simultaneously producing carbon nanotubes and hydrogen according to claim 27, further comprising a support recovery step of recovering the support, on which the carbon nanotubes are synthesized, from the reactor, after the synthesis step, wherein the steps in the method for simultaneously producing carbon nanotubes and hydrogen are repeatedly performed.

30. The method for simultaneously producing carbon nanotubes and hydrogen according to claim 29, further comprising:

a carbon nanotube recovery step of separating and recovering the carbon nanotubes from the support on which the carbon nanotubes are synthesized; and a hydrogen recovery step of recovering the $H_2$ from an emission gas emitted from the reactor.

31. The method for simultaneously producing carbon nanotubes and hydrogen according to claim 27, further comprising:

a separation step of flowing a separation gas over the support, on which the carbon nanotubes are synthesized, to separate the carbon nanotubes from the support into the separation gas; and a support recovery step of recovering the support after the carbon nanotubes are separated, from the reactor, wherein the steps in the method for simultaneously producing carbon nanotubes and hydrogen are repeatedly performed.

32. The method for simultaneously producing carbon nanotubes and hydrogen according to claim 31, further comprising:
- a carbon nanotube recovery step of recovering the carbon nanotubes from an emission gas emitted from the reactor; and
- a hydrogen recovery step of recovering the $H_2$ from the emission gas.

* * * * *